US012075550B2

(12) United States Patent
Campbell et al.

(10) Patent No.: US 12,075,550 B2
(45) Date of Patent: Aug. 27, 2024

(54) FLEXIBLE DRIVER LASER FOR INERTIAL FUSION ENERGY

(71) Applicant: Logos Technologies HoldCo, Inc., Fairfax, VA (US)

(72) Inventors: E. Michael Campbell, San Diego, CA (US); David Eimerl, Suisun City, CA (US); William F. Krupke, Pleasanton, CA (US)

(73) Assignee: Logos Technologies HoldCo, Inc., Fairfax, VA (US)

( * ) Notice: Subject to any disclaimer, the term of this patent is extended or adjusted under 35 U.S.C. 154(b) by 0 days.

(21) Appl. No.: 18/229,582

(22) Filed: Aug. 2, 2023

(65) Prior Publication Data

US 2024/0015877 A1  Jan. 11, 2024

Related U.S. Application Data

(63) Continuation of application No. 16/877,223, filed on May 18, 2020, now Pat. No. 11,765,811, which is a (Continued)

(51) Int. Cl.
*H01S 3/10* (2006.01)
*G21B 1/03* (2006.01)
(Continued)

(52) U.S. Cl.
CPC .......... *H05H 1/22* (2013.01); *G21B 1/03* (2013.01); *G21B 1/23* (2013.01); *H01S 3/0057* (2013.01);
(Continued)

(58) Field of Classification Search
CPC .................. G21B 1/03; G21B 1/23
See application file for complete search history.

(56) References Cited

U.S. PATENT DOCUMENTS 3,995,136 A * 11/1976 Steiger ............... G21B 1/23
376/104
4,306,771 A * 12/1981 Bjorklund ........... H01S 3/0057
359/896
(Continued)

FOREIGN PATENT DOCUMENTS

EP          2439820 A1 *  4/2012  ........... H01S 3/0675
WO   WO-2013023301 A1 *  2/2013  ............... G02F 1/39

OTHER PUBLICATIONS

Eigenwillig, Christoph M., et al. "K-space linear Fourier domain mode locked laser and applications for optical coherence tomography." Optics Express 16.12 (2008): 8916-8937. (Year: 2008).*
Eimerl, D., S. Skupsky, and E. M. Campbell. "StarDriver: Recent results on beam smoothing and LPI mitigation." Journal of Physics : Conference Series. vol. 717. No. 1. IOP Publishing, 2016. (Year: 2016).*
(Continued)

*Primary Examiner* — Lily C Garner
(74) *Attorney, Agent, or Firm* — Brent Whitlock Law, LLC; Brent K. Whitlock

(57) ABSTRACT

Embodiments of a laser system having an extremely large number of small pulsed lasers for irradiating small targets in inertial confinement fusion experiments, high energy density physics experiments, and inertial fusion power plants is more flexible than existing laser systems. Embodiments facilitate finer control of critical features of laser pulses for inertial fusion, as well as significant reduction in development costs and expansion of the community involved in the research relative to existing laser systems. Embodiments produce smooth intensity profiles at the target, large bandwidth that is over two orders of magnitude greater than existing laser systems, and fine control over laser wavelengths, focal properties, temporal pulse shape, and illumination geometry. Properties of each of the small pulsed lasers are individually selectable.

20 Claims, 19 Drawing Sheets

Related U.S. Application Data continuation of application No. 14/057,922, filed on Oct. 18, 2013, now Pat. No. 10,660,192, which is a continuation of application No. PCT/US2012/034289, filed on Apr. 19, 2012.

(60) Provisional application No. 61/477,201, filed on Apr. 20, 2011.

(51) Int. Cl.
  *G21B 1/23* (2006.01)
  *H05H 1/22* (2006.01)
  *H01S 3/00* (2006.01)
  *H01S 3/23* (2006.01)

(52) U.S. Cl.
  CPC ......... *H01S 3/10038* (2013.01); *H01S 3/2391* (2013.01)

(56) References Cited

U.S. PATENT DOCUMENTS

| | | | | |
|---|---|---|---|---|
| 7,609,731 | B2* | 10/2009 | Dantus | G01N 21/4795 372/9 |
| 2011/0228073 | A1* | 9/2011 | Lee | G02B 21/367 348/80 |
| 2013/0021602 | A1* | 1/2013 | Dribinski | H01S 3/10 65/117 |
| 2014/0219300 | A1* | 8/2014 | Schimidt | G02F 1/39 372/25 |
| 2017/0323692 | A1* | 11/2017 | Hubler | G21B 1/13 |
| 2021/0135421 | A1* | 5/2021 | Davis | H01S 3/1301 |

OTHER PUBLICATIONS

Galvanauskas, A., Z. Sartania, and M. Bischoff. "Millijoule femtosecond fiber CPA system." Advanced Solid State Lasers. Optica Publishing Group, 2001. (Year: 2001).*

* cited by examiner

FIG. 13

Hexagonal Image Tiling

FIG. 15

| 3 | | | | | | | | |
| --- | --- | --- | --- | --- | --- | --- | --- | --- |
| 2 | 6 | | | | | | | |
| 1 | 9 | 7 | | | | | | |
| | 5 | 3 | | | | | | |
| | 8 | 2 | 6 | | | | | |
| | 4 | 1 | 9 | 7 | | | | |
| | | | 5 | 3 | | | | |
| | | | 8 | 2 | 6 | | | |
| | | | 4 | 1 | 9 | 7 | | |
| | | | | | 5 | 3 | | |
| | | | | | 8 | 2 | 6 | |
| | | | | | 4 | 1 | 9 | 7 |
| | | | | | | | 5 | 3 |
| | | | | | | | 8 | 2 |
| | | | | | | | 4 | 1 |

FLEXIBLE DRIVER LASER FOR INERTIAL FUSION ENERGY

RELATED APPLICATIONS

This application is a continuation application of U.S. patent Ser. No. 16/877,223, entitled "Flexible Driver Laser for Inertial Fusion Energy" and filed on May 18, 2020, which is a continuation application of U.S. patent Ser. No. 14/057,922, entitled "Flexible Driver Laser for Inertial Fusion Energy" and filed on Oct. 18, 2013, which is a continuation application of Patent Cooperation Treaty International Application Number PCT/US2012/034289, entitled "A Flexible Driver Laser for Inertial Fusion Energy" and filed on Apr. 19, 2012, which claims priority to U.S. Provisional Patent Application No. 61/477,201, entitled "Star-Driver—a flexible driver laser for inertial fusion energy" and filed on Apr. 20, 2011, the priority benefit of all of which are hereby claimed, and the entirety of all of which is hereby incorporated by reference.

BACKGROUND

Field

Embodiments generally relate to the art of inertial confinement fusion, and more particularly to driver lasers for inertial fusion energy and high energy density science applications.

Related Art

Inertial confinement fusion (ICF) is the science and technology of achieving controlled thermonuclear fusion wherein matter is compressed and heated to extreme conditions, a state often described by high energy density physics (HEDP), such that nuclear reactions occur. [Nuckolls1972, Nuckolls1982]

The primary embodiment of inertial confinement fusion utilizes a very large laser system to irradiate a small target containing a small amount of fuel comprised of light nuclei, thereby compressing and heating the fuel to warm density matter conditions. The fuel remains in this state of high energy density for a very short time, just long enough for significant nuclear energy to be released. A related field is inertial fusion energy (IFE), which is the science and technology of using inertial confinement fusion in a commercial power plant to produce electricity for commercial use through the national power grid, and other applications. [Campbell1999a, Campbell1999b, Hogan1991, Campbell1999c, Moses2009, Nardella2008, Storm1991, Dunne2012, Obenschain2011]

The US government has supported studies of ICF and IFE for many years. For ICF the goal is to support the nuclear weapons programs at the National Laboratories, and as such the programs have been administered by the National Nuclear Security Administration (NNSA). [Campbell1999c, Paisner1994,Campbell1999b, Nardella2008] The NNSA's mandate is nuclear security—it has no mandate in IFE. The NNSA programs are therefore specifically limited to nuclear security. As such, a goal of the NNSA programs has been to develop the capability to create significant neutron fluences, by the most rapid, cost-effective, and reliable path. This path is substantively different from the development path for IFE. Thus, the NNSA programs have not had a focused and extensive effort on the development of the possible optimal technological approaches to ICF/IFE in civilian and commercial applications. The prior art is therefore interesting as background and shows some features of the architecture that can be utilized for IFE, but is silent on some of the essential technologies for IFE/ICF.

The nuclear fusion reaction that has been the primary focus of ICF under U. S. government funding is the nuclear reaction between deuterium (D) and tritium (T) nuclei, which are isotopes of hydrogen. The DT reaction can efficiently produce a helium nucleus (a) and a neutron (n), releasing significant energy. By collecting the products of the reaction, the released energy can be collected and transformed into heat and electrical power. There are several national security applications of ICF including supporting the scientific base for nuclear weapons (Stockpile Stewardship Program), producing materials such as tritium for the nuclear deterrent, and destroying (transmuting) spent nuclear fuel from fission reactors. Both ICF and IFE include the study of other nuclear reactions, and so are not restricted to the DT reaction. Fusion can also be used in conjunction with fission to produce energy in "hybrid systems."

In laser-driven inertial confinement fusion (ICF) [Nuckolls1972, Nuckolls1982], a large laser irradiates a small target containing an approximately spherical capsule containing fuel comprised of carefully selected light nuclei. This approach is called "direct drive." [McCrory2011]. In an alternative approach called "indirect drive," the laser energy is first converted into x-rays in an enclosure (called a hohlraum) containing the fusion capsule [Lindl1995]. The laser irradiation (or x-rays for indirect drive) ablates the outer surface of the capsule. The ablated material has a high momentum, and acts on the capsule in a manner similar to a rocket engine, forcing the capsule surface inward. As the capsule implodes in response to the ablation forces, the fuel contained by the capsule is compressed and heated. After the laser pulse has ended, the capsule continues to implode, coasting inward to smaller size, but slowing down. At some point in time, the capsule stagnates briefly. Thereafter, the capsule disassembles (explodes) under its own pressure and the pressure of the fuel it contains after significant thermonuclear reactions have taken place. At stagnation, the fuel is ideally in a state of high energy density, which is defined as having a temperature and density such that nuclear reactions take place. During the very brief moments of stagnation (about $10^{-10}$ seconds), the fuel pressure reaches values of 200 billion atmospheres (higher than that found in the center of many stars), and energy is released by the nuclear reactions in the form of kinetic energy of the particles produced or created by the nuclear reaction. Some of the released energy is captured in the fuel, heating the fuel further, and some of the released energy escapes and is captured for subsequent use. In addition to this standard approach of compression and heating that occurs through the action of a single driver laser, other approaches have been investigated for igniting the fuel after it has been compressed. These include shock ignition. [Theobald2008, Theobald2009, Perkins2009] and fast ignition [Tabak1994, Deutsch1998, Campbell2006], which are both alternative approaches to initiating the burn of DT in high energy density matter.

The time during which nuclear reactions occur, or the time during which high energy density matter conditions are maintained, is essentially the time elapsed while the fuel and capsule stagnate, before they accelerate outwards under the action of their own pressure. The fuel and capsule resist this outward acceleration simply by their own inertia. Thus, it is the inertia of the fuel and capsule that tends to maintain the high energy density condition achieved at stagnation. Therefore, nuclear energy is produced only during the time the fuel is inertially confined at stagnation. Ideally, the stagnation time is long enough to permit many nuclear reactions to take place and significant usable energy to be released. Thus, the art is termed "inertial confinement fusion."

The art of inertial confinement fusion (ICF) divides generally into two areas, targets (i.e., fuel and capsule) and drivers, with driver lasers being the most common. Both areas involve complex science and technology factors, making ICF technically challenging. Experiments to date on ICF have indicated the general features of the driver laser, and the structure of the targets, but significant uncertainties remain to be resolved in both areas.

For inertial fusion energy (IFE), an ICF core is embedded in a power plant. To produce useful amounts of electrical power for the national grid (typically 100 MW to 1 GW), targets must release about 50-100 times the laser energy used to drive the implosion, and they must be irradiated by the laser several times a second (~5 to 15 Hz, depending on target energy yield). The balance of the power plant deals with the technology of capturing the energy released and converting it into electricity for the national grid or other uses, the technology of target fabrication, and laser operation. The whole enterprise is constrained by the cost of electrical power (USD/MW-hr) supplied to the national grid. Power plants currently sell electricity to power distributors at a rate between 100 and 150 USD/MW-hr. In IFE, there are many additional factors to consider beyond the science and technology of ICF. For the laser, these include the need to fire the laser several times a second, the need to limit the down-time of the laser system for maintenance, the need to preserve the quality of the optical pulses used to irradiate the target, its wallplug efficiency and its capital cost.

As one might imagine, there are many complex scientific and technological aspects to ICF and IFE. Some of these aspects have been identified, but significant experimentation and technological developments will be required before a practical IFE power plant can be designed and operated.

A laser system for driving an inertial fusion target must meet a stringent set of requirements [Bayramian2010, Bayramian2011, Orth1996, Caird2009]. The requirements include the following: a total laser energy greater than about 1000 kJ (significant research may be able to reduce this to ~500 kJ); a small focal spot typically around 500 microns in size; a wavelength in the visible or ultraviolet region typically between 550 nm and 250 nm; a pulse length of a few tens of nanoseconds; a spatial profile of the total intensity such that on short time scales of about several picoseconds, the intensity profile in the focus is uniform; a bandwidth adequate to suppress laser-plasma and hydrodynamic instabilities, typically greater than a few THz; and a complex temporal pulse shape that compresses the DT fuel without excessive heating early on, typically beginning with a short spike lasting less than 1 nanosecond followed by a smooth rise over many nanoseconds to a peak, followed by an approximately constant power for a few nanoseconds. For energy applications, the laser system must include a means of measuring the position and orientation of a target moving at a high velocity of approximately 100 m/s, pointing the laser system at the target, and delivering the correct laser pulse format to the target. In addition, the laser system must typically do this several times a second. These requirements are challenging to meet in one and the same laser system.

The configuration of the driver laser is constrained by available laser technology. Numerous research studies over the past 40 years have shown that target physics requires an illuminating wavelength in the ultraviolet (250-350 nm) or perhaps visible (500 nm) ranges. These wavelengths are either produced directly as in the output of KrF lasers [Sethian2002] or by non-linear frequency up-conversion of the fundamental 1053 nm wavelength of Nd:glass lasers to 355 nm. [Paisner1994, McCrory2012] The wavelength is constrained by the damage threshold of currently available optics. In the ultraviolet range, today the damage threshold of the optics at the exit aperture is typically 1-2 GW/cm$^2$, or equivalently 3-5 J/cm$^2$. To provide a megajoule of ultraviolet energy, given current damage thresholds, the total area of the exit aperture of all the lasers is approximately 100 square meters. There is some advantage to using visible or infrared wavelength, because the damage threshold is significantly higher than in the ultraviolet at 355 nm. There are many other requirements on the laser system for inertial fusion energy production, but here we are concerned mostly with the configuration of the laser(s) themselves. Given the total energy required, the damage threshold for optics, physics and manufacturing constraints on laser aperture size, fusion capable ICF and proposed prior IFE laser systems typically have one to several hundred identically configured laser beams with nominal aperture size of 20-40 cm.

The driver laser for the most common approaches to inertial fusion typically delivers just one pulse to the target that compresses the DT fuel and causes the fuel to ignite and burn. In several advanced approaches such as the fast igniter [Tabak1994, Deutsch1998, Campbell2006], as mentioned above, two laser pulses are envisioned with different functions, one to compress the DT fuel and another to ignite the fuel. The fuel igniter laser requirements are generally quite different from the fuel compressor laser. Though still uncertain, the igniter requirements include an energy around 100-200 kJ, a pulse length approximately 10 picoseconds, and a focal spot size of tens of microns. In other advanced applications, such as shock ignition [Theobald2008, Theobald2009, Perkins2009], two laser pulses or a single appropriately shaped laser pulse may also be used, one to create a low velocity compression and the second to launch a shock which ignites the fuel.

One of the key requirements for ICF is that the target should maintain its spherical shape while being compressed [Lindl1995, McCrory2011, Obenschain2011]. In direct drive fusion, the laser beams impinge directly on the target itself, and therefore the spatial profile of the laser drive should be highly uniform. Drive nonuniformity causes the shape of the target to deform during the implosion by two distinct mechanisms. The first mechanism is simply that if the acceleration of the shell is not uniform, the shape of the shell changes as it imploded and so either at stagnation the capsule will not be spherical or the stagnation of the capsule will not be simultaneous around the shell. Then the density and temperature of the fuel may not reach ignition values. The second mechanism is that shell perturbations are amplified by the Rayleigh-Taylor and Richtmeyer-Meshkov hydrodynamic instabilities causing cold matter from the shell to penetrate the hot fuel at stagnation. This cold matter can also cause the target to fail to reach ignition. By and large, effects such as hydrodynamic smoothing tend to make the acceleration uniformity requirement more significant at longer spatial scales, and the Rayleigh-Taylor and Richtmeyer-Meshkov hydrodynamic instabilities more significant at shorter spatial scales. In general, the overall uniformity requirement is that the rms nonuniformity should be less than about 0.25% to 1% when integrated over the e-folding time for the instabilities.

Another requirement for ICF is that the energy of the laser should couple relatively efficiently to the implosion. Laser ablation creates a plasma surrounding the target comprised of the ablated materials. The plasma surrounding the target can act as a medium in which the laser can drive laser plasma instabilities (LPI) such as filamentation, stimulated Raman scattering (SRS), stimulated Brillouin scattering (SBS) and the $2\omega_{pe}$ instability. LPI scatters the laser drive and in so doing reduces the energy that is coupled to the implosion and redirects the laser light energy so that it is non-uniform. For example, stimulated Brillouin scattering causes energy to be transferred from one beam to another and changes the sphericity of the drive. Also, some LPI processes, such as SRS and the $2\omega_{pe}$ instability, can produce energetic electrons that can "preheat the fuel" and make compression more energy intensive. The requirement on the laser drive to avoid LPI is essentially that the laser bandwidth should be at least about 1-2% of the laser frequency.

Typically, some type of beam conditioning is required to ensure that the uniformity and bandwidth requirements are met. The laser technology involved is termed "beam smoothing". There are two existing approaches to beam smoothing: Induced Spatial Incoherence, implemented on Nike [Lehmberg1998]; and smoothing by spectral dispersion [Skupsky1989], implemented on NIF, LMJ and Omega, as described below.

As mentioned above, there are several options for the driver laser and the target design. The two primary target options are indirect drive and direct drive. In addition, a third approach is a variant of the direct drive approach, known as polar direct drive. The two primary laser options in the prior art are the NIF-style Nd:glass laser[Paisner1994] and the KrF laser[Sethian2002, Obenschain2011]. A third but impractical laser option utilizes a fiber approach[Labaune2008]. Because the highest energy gain (fusion yield/driver energy) is believed to be provided with direct drive target designs, direct drive is today the most interesting for IFE. However, the NNSA programs, which are motivated by national security missions, have invested heavily in NIF-style Nd:glass lasers and indirect drive targets. High gain indirect drive concepts have also been proposed that may satisfy the requirements for IFE. However, the current suite of existing NNSA laser facilities is not optimally configured for exploring and demonstrating ignition in direct drive targets. In fact, given its national security mission and focus, a laser concept that meets all the requirements for IFE has not been developed in the NNSA program.

At the same time, the reactor technology (the technology of capturing, converting and using the energy released by the targets) has been funded by a different agency of the US government. The so-called HAPL (High Average Power Laser) program at the Naval Research Laboratory in Washington, DC, LLNL and other participants, has been funded by Congress to develop KrF and diode pumped solid state (DPSSL) laser technologies and to study reactor technology and other issues associated with IFE such as target production and injection. A great deal of progress has been made on both KrF laser technology [Sethian2002], on advanced solid state laser approaches[Bayramian2007], and on some elements of the reactor. However, these studies have been directed to understanding the balance of elements in an IFE power plant and the design of the reactor which captures the energy released from the targets. They have not been directed to understanding how to configure the laser driver so that the full set of target requirements can be met simultaneously.

Under the NNSA program, studies of ICF have been carried out at the Lawrence Livermore National Laboratory (LLNL) [Haynam2007][Paisner1994][Campbell1999], the Laboratory for Laser Energetics (LLE) at the University of Rochester, NY,[LLE2012] and the Naval research Laboratory in Washington DC [Sethian'2002]. The earliest studies date from the early 1970's. The lasers used at LLNL and LLE are generally referred to as NIF-style lasers, after the National Ignition Facility at LLNL.

The NIF-style laser [Haynam2007] is a flash-lamp pumped Nd:glass laser. Several generations of glass lasers have been built at LLNL, each one significantly larger than the previous laser. The configuration of this laser is a master-oscillator/power amplifier, in which a small laser beam with the desired pulse shape and spatial mode properties is first generated in the master-oscillator and then amplified in a series of power amplifiers and transport optics before being focused onto a target[Paisner1994]. The more recent Nd:glass lasers have included a frequency conversion device that converts the wavelength of the laser beam from 1064 nm in the infrared to 355 nm in the ultraviolet, before the wavelength-converted beam is focused onto the target, as well as other "beam conditioning systems such as phase plates to control the focal spot profile [Paisner1994,Haynam2007]. This laser approach is mature (for example, NIF is the sixth laser build by LLNL since the early 1970's) and so has minimal risk as a choice for a driver laser for ICF. While low risk may be an attractive feature for nuclear security programs, when NIF is measured against the requirements for IFE, several short-comings are evident. For example, its efficiency (optical energy out/electrical energy in) is less than 1%, whereas the requirement is around 10%. It has a very narrow bandwidth, about 0.25 THz, whereas the requirement to suppress LPI is believed to be around 1-2% of the laser frequency, or perhaps greater. The smoothing technique used by NIF at LLNL and Omega[LLE2012] is smoothing by spectral dispersion (SSD)[Skupsky1989,Skupsky1993], which is essentially a means of causing the laser beam to shimmer at a high rate at the target. The smoothness of the LLNL laser pulses at the target is significantly higher than 20%, and the smoothness of the LLE laser pulses is about 10%, to be compared with the requirement which is typically 0.25%. It is difficult if not completely impractical to configure a NIF-style laser to deliver more than about 1 pulse per second, without significant advances in laser amplifier technology, whereas the requirement for IFE is about 5-15 pulses per second. Achieving a high repetition rate a NIF-style laser is challenging because of the large beam aperture. Also the wallplug efficiency of a NIF-style laser is ~1% today. Again with significant advances in laser architecture and amplifier design this can be improved, but it is unlikely to meet the IFE requirement.

The NIF-style laser configurations used by LLNL have included several separate beam lines, all nominally identical and delivering the same pulses to the target. The latest system at LLNL, the National Ignition Facility [Paisner1994][Campbell1999a][Haynam'2007] uses 192 beams in 48 clusters delivering pulses to a target chamber about 5 meters in radius, containing a target placed at its center. The final focusing lenses are about 7 meters from the target. The total energy per pulse delivered by NIF is up to 1.8 MJ at 355 nm, delivered in a pulse length of approximately 25 ns. The latest system at LLE is Omega [McCrory2012] which uses 60 beams and delivers about 30 kJ of energy in the ultraviolet in about 1 nanosecond.

Variants of the NIF-style laser adapted to some of the special requirements of commercial energy production have been studied [Caird2009, Storm1991, Campbell1999a, Hogan1991], and some initial experiments have been carried out to test them [Bayramian2007].

The laser used at NRL is Nike, a Krypton Fluoride (KrF) laser. [Sethian2002] The KrF laser operates in the ultraviolet at 248 nm. It also is configured as a master-oscillator power amplifier. The KrF laser has the best smoothness achieved to date, which is less than 1%. The KrF laser uses the smoothing technique of induced spatial incoherence [Lehmberg1993, Lehmberg1998, Lehmberg2000, Lehmberg2005]. The Nike laser bandwidth is less than 5 THz, and its efficiency can potentially be as high as 7%. The optical configuration of the KrF laser involves passing a few short pulse beams in sequence through an amplifier and then passing each beam through an optical delay so the beams arrive at the target simultaneously. The KrF laser has some attractive features for IFE[Obenschain2011], compared to the NIF-style laser, a flexible KrF design that meets all the requirements has proved elusive.

A regular feature of the prior driver lasers is that their configuration is typically master-oscillator/power-amplifer (MOPA), where a primary oscillator provides a single small seed pulse that is optically divided using beam-splitters into many seeds. All seed pulses are therefore coherent with each other. Individual seed pulses may be shaped and modulated in slightly different ways. Each seed pulse passes through a separate amplifier or a system of amplifiers, one for each seed, where the seed pulse is amplified and subsequently focused onto the target. Thus the pulses from all the beams focused onto the target are coherently related. For the NIF-style laser, the primary seed is highly spatially coherent. The modulation is used in conjunction with diffraction gratings according to the SSD methodology. The optical phases of the beams across each beam aperture are therefore highly coherent. Even after passing through a phase plate, a high degree of spatial coherence remains. Thus every time the laser fires, the same phase relationships exist between the beams impinging on the target which compromises the smoothness of the drive at the target. Indeed, it is challenging for a Nd:glass laser configured as in the prior art to deliver a laser drive at the target with the required smoothness for direct drive target.

For the KrF laser system, the primary seed is multimode, and after being split, it is amplified and imaged onto to the target. The asymptotic smoothness of the drive at the target is limited by the spatial intensity profile at the target associated with each spatial mode, and the rate of smoothing is controlled by the bandwidth. While the KrF laser has achieved the best asymptotic smoothness in the prior art, the smoothing rate is limited by the (gain-narrowed) bandwidth of the KrF laser amplifiers, which is typically 1-2 THz.

Other lasers for ICF are planned. The Laser MegaJoule in France [Bettinger1999] was developed in close scientific collaboration with LLNL. It is not yet completed, but as currently planned it will have the same smoothness, bandwidth and mean wavelength as the NIF-style laser at LLNL. It does not represent a substantively different approach to ICF and IFE from NIF. NIF-style lasers are also being considered in Europe (e.g., HiPer) [Dunne2007] and Japan (Firex) [Azechi2006], Russia (Unnamed) [Dean2012] and China (Divine Light 4) [Dean2012]. All these systems have the same general features as NIF in regard to smoothness, bandwidth, and mean wavelength. Consequently, none of them meet all the requirements for direct drive ICF or IFE. These laser systems all have a few, large aperture (~40 cm) beams, and face challenges of adequate flexibility in pulse shaping, frequency conversion, bandwidth, beam smoothness, and smoothing rate. The recent proposal for an IFE demonstration known as LIFE (Laser Inertial Fusion Energy) [Bayramiam2009, Bayramian2010, Caird2009, Moses2009] is an adaptation of the NIF-style laser to IFE, and so it too will have significant challenges to meet all of the IFE requirements.

A different approach has been proposed by an international group of scientists where the laser system is built from a very large number (more than 10,000,000), very small individual single-mode Ytterbium fiber lasers [Labaune2008]. Each fiber laser output is collected by a lens and focused on the target. To focus on the target, the lens diameter has a minimum size, and this limits the number of lenses. The lens size is such that the entire 4πc solid angle surrounding the target would be significantly filled by approximately 10-20 million lenses. The number of fiber lasers must obviously be significantly less than this. To deliver one megajoule of light, each laser must deliver significantly more than 100 mJ. This is well in excess of the state of the art in single mode fiber laser technology, which is about 10 mJ. Moreover, there are optical engineering challenges such as beam pointing that are extreme in this approach. Even though the fiber approach has been described in the literature related to IFE, it could not be used for IFE without significant invention and development in both large mode area fiber lasers, and precision optical alignment.

All of the laser systems either utilized or conceived in the prior art face significant challenges in meeting simultaneously all the requirements for a successful implosion of a high gain target for ICF or IFE, and all of them have limited flexibility to accommodate different target designs.

SUMMARY

Embodiments include a configuration of a large laser system for use in inertial confinement fusion and specifically tailored for inertial fusion energy production and HEDP Embodiments include configuring a driver laser as a very large number of small beamlets, which are independently configurable. Embodiments provide extreme flexibility in obtaining the required laser drive at the target, through control of the frequencies and other properties of individual beamlets. The beam smoothing and bandwidth of the laser system enables the laser system to meet all of the requirements on the total laser drive, including, wavelength(s), bandwidth, smoothness, temporal pulse shape, and focusing of the laser drive. It also enables time sequencing of the pulses from individual beamlets or groups of beamlets, so that all of the features of a laser may be finely controlled at each instant during the entire laser drive pulse. Embodiments also facilitate significant cost savings by sharing support hardware among many beamlets, and reduced development costs for a single beamlet. Embodiments also enable greater wall-plug efficiency for the driver laser, minimizing the size and cost of the laser hardware itself.

In an embodiment, a laser system includes a plurality of pulsed lasers that emit laser pulses. The plurality of pulsed lasers are configured such that all of the plurality of pulsed lasers emit a laser pulse that irradiates a target within a same time window of less than about 100 ns. At least two of the pulsed lasers have different central optical frequencies such that the central optical frequencies of their respective emitted laser pulses differ by more than 1 THz.

The plurality of pulsed lasers may be configured such that each pulsed laser emits a laser pulse that irradiates the target within the same time window such that the target releases thermonuclear energy in response to the irradiation.

The laser system may further include a laser controller that controls the pulsed lasers such that each pulsed laser irradiates the target with a laser pulse substantially simultaneously with the other pulsed lasers.

The plurality of pulsed lasers may include at least 512 and less than 262,145 pulsed lasers.

The plurality of pulsed lasers may be configured to deliver the laser pulses to the target in a substantially spherical distribution.

The plurality of pulsed lasers may each include an exit aperture and the plurality of exit apertures may be distributed substantially spherically around the target.

A distribution of the central optical frequencies of the pulsed lasers may be correlated with a direction of propagation and a focal spot location of the respective laser pulses emitted by the pulsed lasers toward the target according to a predetermined prescription.

The predetermined prescription may substantially maximize a spatial uniformity of intensity of the plurality of laser pulses at a surface of the target as computed from a ratio of the root mean square variation in the intensity over the surface of the target to the average value of the intensity over a time interval during which the plurality of laser pulses irradiate the target surface.

According to a predetermined prescription, a variation in spatial uniformity of intensity of the plurality of laser pulses at a surface of the target as computed from a ratio of the root mean square variation in the intensity over the surface of the target to the average value of the intensity over a time interval during which the plurality of laser pulses irradiate the target surface may be less than about 0.25%.

A smoothing rate of the summation of the plurality of laser pulses of the laser system at the target may be substantially maximized at a spatial scale length of between about 10 and about 100 microns, according to the predetermined prescription.

The plurality of laser pulses from the laser system that irradiate the target may be substantially smoothed at a rate faster than about 30 THz, according to the predetermined prescription.

A central optical wavelength of each pulsed laser may be between about 250 nm and 2500 nm, and the root mean square bandwidth of the laser system may be greater than about 1 THz.

Temporal pulse shapes of the at least two of the pulsed lasers having different central optical frequencies may be substantially different from each other.

Optical states of polarization of at least two laser pulses that irradiate the target from different respective pulsed lasers may be substantially different.

A temporal pulse width of at least one of the plurality of laser pulses may be less than about 50 ps.

A first temporal pulse width of a first laser pulse of the plurality of laser pulses may be between about 1 ns and 100 ns, and a second temporal pulse width of a second laser pulse of the plurality of laser pulses may be less than about 50 ps.

At least two of the plurality of laser pulses may irradiate the target surface at substantially different times.

An angle between propagation directions of any two laser pulses from respective pulsed lasers whose central optical frequencies differ by less than about 250 THz may be greater than about 0.01 radians.

In another embodiment, a laser system includes a plurality of at least 512 and less than 262,145 pulsed lasers that emit laser pulses toward a target. At least two of the pulsed lasers have different central optical frequencies such that the central optical frequencies of their respective emitted laser pulses differ by more than about 1 THz. A plurality of exit apertures are spatially distributed around the target such that the laser pulses from each of the plurality of pulsed lasers pass through a separate one of the plurality of exit apertures to irradiate the target from a different direction. The laser system also includes a laser controller that controls the plurality of pulsed lasers such that all of the plurality of pulsed lasers irradiate the target with a laser pulse within a same time window of less than about 100 ns.

At least two of the pulsed lasers may have different central optical frequencies such that the central optical frequencies of their respective emitted laser pulses differ by more than about 2 THz.

A distribution of the central optical frequencies of the pulsed lasers may be correlated with a direction of propagation and a focal spot location of the respective laser pulses emitted by the pulsed lasers toward the target according to a predetermined prescription.

The predetermined prescription may substantially maximize a spatial uniformity of intensity of the plurality of laser pulses at a surface of the target as computed from a ratio of the root mean square variation in the intensity over the surface of the target to the average value of the intensity over a time interval during which the plurality of laser pulses irradiate the target surface.

According to the predetermined prescription, a variation in spatial uniformity of intensity of the plurality of laser pulses at a surface of the target as computed from a ratio of the root mean square variation in the intensity over the surface of the target to the average value of the intensity over a time interval during which the plurality of laser pulses irradiate the target surface may be less than about 0.25%.

In another embodiment, a method of driving an inertial confinement fusion reaction for inertial fusion energy generation includes emitting a plurality of laser pulses from a plurality of pulsed lasers. Central optical frequencies of at least two of the pulsed lasers are different from each other by more than about 1 THz. The method also includes directing the plurality of laser pulses toward a target from different exit apertures along different propagation directions such that all of the plurality of laser pulses irradiate different portions of the target within a same time window of less than about 100 ns.

Central optical frequencies of at least two of the pulsed lasers may be different from each other by more than about 2 THz.

The method may further include correlating a distribution of the central optical frequencies of the pulsed lasers with a direction of propagation and a focal spot location of the respective laser pulses emitted by the pulsed lasers toward the target according to a predetermined prescription.

According to the predetermined prescription, a variation in spatial uniformity of intensity of the plurality of laser pulses at a surface of the target as computed from a ratio of the root mean square variation in the intensity over the surface of the target to the average value of the intensity over a time interval during which the plurality of laser pulses irradiate the target surface may be less than about 0.25%.

The method may further include correlating a distribution of optical pulse shapes of the pulsed lasers with the distribution of propagation and focal spot location of the respective laser pulses emitted by the pulsed lasers toward the target according to the predetermined prescription.

BRIEF DESCRIPTION OF THE DRAWINGS

FIG. 13 illustrates an optimal distribution of nine frequencies among the beamlets, according to an embodiment.

FIG. 15 illustrates an exemplary pattern of spatial frequency spectrum of four frequencies.

FIG. 16 illustrates an exemplary pattern of spatial frequency spectrum of nine frequencies.

FIG. 17 illustrates an exemplary pattern of spatial frequency spectrum of sixteen frequencies.

DETAILED DESCRIPTION

Figure 1:
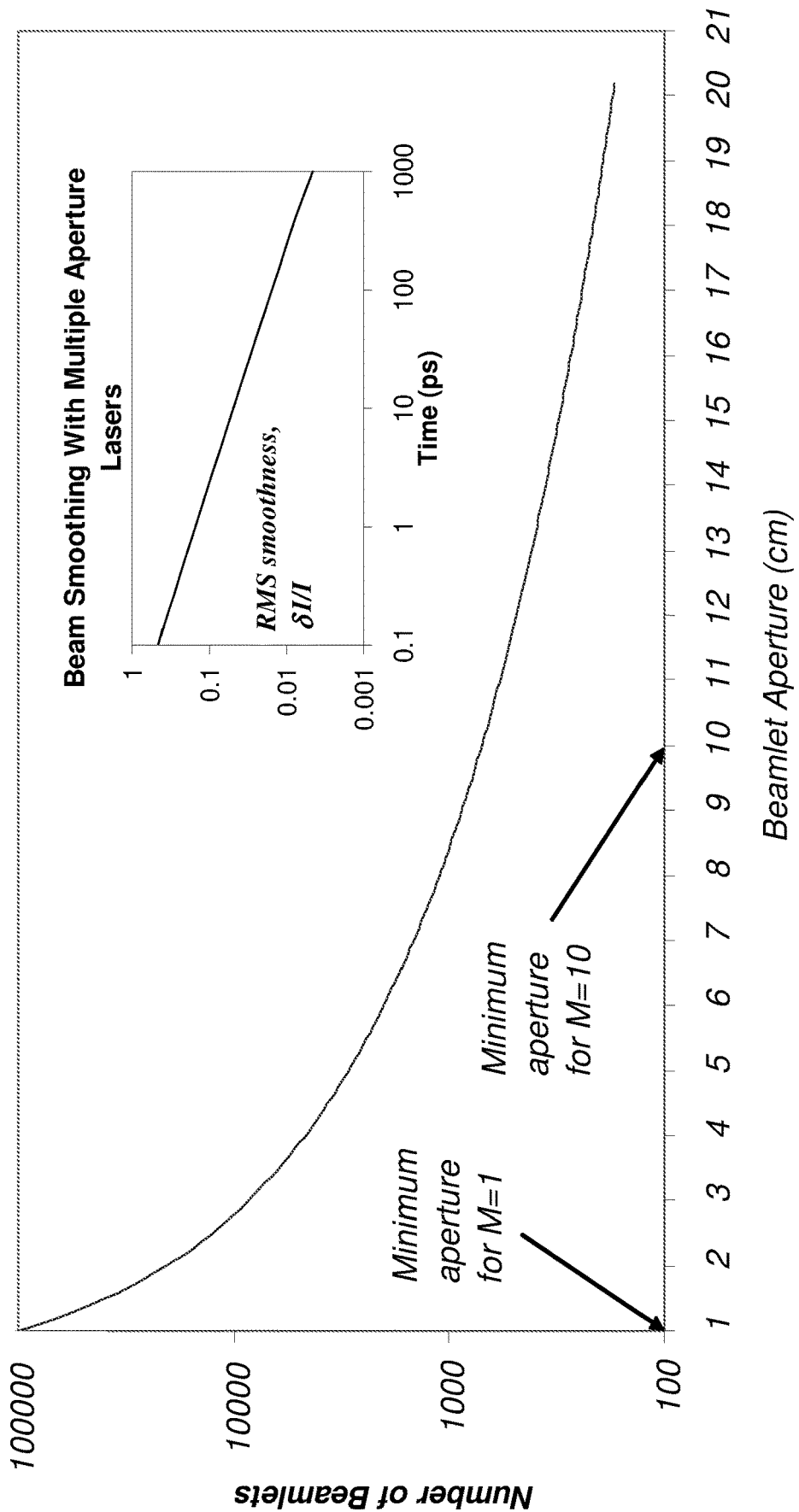
FIG. 1 shows the minimum number of beamlets required for beamlets of various apertures, according to an embodiment.

Current lasers used for ICF studies present multiple challenges to meet all the beam smoothing requirements resulting in reduced energy available on target, system complexity, or compromised beam smoothing performance. Therefore, to address these system deficiencies, the multiple aperture laser as herein described is a new approach to meet both the bandwidth and uniformity requirements. In the multiple aperture approach, many small lasers with a small aperture of a few centimeters, and numbering as many as 100,000 or more, are directed simultaneously to the target. Each of these many small lasers is referred to herein as a "beamlet." In various embodiments, the beamlets are not all identical, but have a wide variety of beam features. For example, the beamlets may differ in their distribution of frequency among the beamlets and the total bandwidth of the ensemble of beamlets. Moreover, each beamlet may have a small aperture, for example several centimeters.

Each beamlet may have a spot size at the target that is smaller than the dimensions of the target itself. As efficient energy coupling generally requires matching the size of the laser drive to the size of the target, in various embodiments, the efficient energy coupling requirement may be met by the summation of all the spots from all the beamlets at the target. The spatial structure in the laser drive at the target may be determined by both the interference of all the beams and the architecture and methods for ensuring that the size of the laser profile at the target matches the target dimension.

From the point of view of target physics, the low L-mode portion of the spatial mode spectrum includes the spatial wavelengths that are most significant for acceleration uniformity, whereas in the high L-mode portion of the spectrum, hydrodynamic instabilities are more significant. From the point of view of laser technology, however, the long-wavelength portion of the spectrum deals with the need to match the size of the laser drive to the target dimension, whereas the short wavelength portion deals with the interference patterns between overlapping beams. The appropriate division of the spectrum is generally different for target physics than for laser technology. Here it natural to adopt the laser technology point of view.

Optical techniques for achieving low L-mode uniformity can potentially compromise the high L-mode uniformity. For example, low L-mode uniformity may be attempted by tiling the target disc with many spots, i.e. pointing individual beamlets in slightly different directions so that their diffraction-limited spots do not necessarily overlap. However, as the number of beamlets that overlap in the target disc is reduced, the high L-mode uniformity deteriorates. If the beamlets tile the target disc with many distinct tiles, the number of overlapping spots is smaller. Then, the high-spatial frequency uniformity can become unacceptably large. Therefore, the method for obtaining low L-mode uniformity should not reduce the number of overlapping beamlets significantly.

The challenge of configuring a laser system to meet all the target requirements simultaneously has not been previously addressed. The laser systems that have been proposed and the laser systems that have been built meet some of the requirements, but not all. However, in various embodiments, embodiments of a driver laser as described herein address simultaneously meeting all the requirements. Various embodiments of a driver laser as described herein have a large number of beams and offer a practical, cost-effective laser system that simultaneously meets all of the target requirements, in sharp contrast to the current laser systems. If the beamlets are differentiated according to the prescriptions set forth herein, the laser drive according to various embodiments will have the flexibility to meet all of the requirements. Beamlets may be differentiated from each other in many ways, including their wavelengths, temporal pulse shapes, spot sizes on target, spatial profiles on target, laser pointing, and polarization.

Embodiments employ a multiple aperture approach to IFE laser systems, in which many (N in total number) individual laser systems ("beamlets") are directed independently to the target area. A typical IFE configuration places all N laser beam apertures closely together so that the beams all lie within a cone of small angle when viewed from the target. The beams may also be distributed around the target, in which case they may subtend a few percent of the $4\pi$ solid angle when viewed from the target. In order to control costs, the lasers may have a minimal number of components, they may have many common components, and they may share support facilities such as pulsed power and control hardware. To some extent, then, the multiple aperture laser system can be viewed as a single laser/electro-optic system with many independently directed output apertures. Each individual laser system may include an oscillator, amplifiers, and transport optics such as spatial filters. Each individual laser may be presumed to have a minimum number of components, with no output beam conditioning, phase plates, or adaptive optics. The lasers may be presumed to have a nominal wavelength in the infrared, so there may be a frequency convertor between the output of the laser and the final focusing optics. The wavelengths of the lasers need not be the same. In fact, if all the beamlet lasers use the same gain medium, the total bandwidth may be too small to affect target performance. For ICF and IFE, bandwidth is important, so in embodiments, the wavelength of each beamlet in the multiple aperture laser may be independently specified. However, we recognize that in the extreme case of N different wavelengths, some of the cost reduction coming from having shared components may be lost.

The oscillator of each laser may be a resonator containing a gain medium. Even though the source of light from the oscillator may be amplified spontaneous emission (ASE), the resonator may provide mode discrimination such that all modes but one of the ASE from the gain medium experience a high loss. The oscillator may also include beam spatial profile conditioning to optimize the laser performance and the coupling of the laser beam to the target. This may result in an output field from the oscillator that is preferably a single frequency (longitudinal) mode with a specific, appropriately chosen spatial profile. At a reference time to, the input to each laser chain may be represented as shown in Eq. 1:

$$E(x,y,t_0)=e^{i\xi} \cdot E_{in}(x,y,t_0) \quad \text{(Eq. 1)}$$

The field $E_{in}$ describes the temporal envelope of the wave packet produced by the oscillator. The phase $\xi$ is determined by the quantum source of the emission in the oscillator. On any pulse from the oscillator, the phase $\xi$ is a constant in time, but over an ensemble of many pulses, the phase is uniformly distributed from 0 to $2\pi$. The beam in the target area is the sum of the beams of a single (amplified) pulse from each oscillator, and is described by a set of quantum phases $\{\xi_i: 1 \leq i \leq N\}$. This set of phases is fixed for each target shot, but it is a different set for each target shot. We may not average over this set of phases in calculating the intensity profile on any given shot, and we should be mindful of the range of possibilities on any one shot derived from the range of values these phases may take.

The pulse from each oscillator at time t in a particular target shot may be expressed as Eq. 2:

$$E(x,y,t)=e^{i\xi} \cdot E_{in}(x,y,t)e^{i\omega(t-t_0)} \quad \text{(Eq. 2)}$$

This beam propagates to the output of the laser, being amplified and distorted by the gain profile and aberrations in the laser optics. The beam just before reaching the frequency convertor may be expressed as Eq. 3:

$$E(x,y,t)=e^{i\xi+i\omega t}\int dx'dy'dt' e^{i\omega R/c} D(x,y;x',y',t_{ret})E(x',y',t_{ret}) \quad \text{(Eq. 3)}$$

where R is the optical distance from (x',y') to (x,y). The propagator D (or green's function) representing the optics and gain of the laser system takes into account beam magnification, the gain profile, and optics aberrations. The propagator D also accounts for the optical group delay $t_d$ between the oscillator and the frequency convertor. The optical group delay $t_d$ may be expressed as Eq. 4:

$$t_d = \sum_{\text{laser components}} s_i/v_{gi} \quad \text{(Eq. 4)}$$

Here $s_i$ is the propagation distance in the i-th laser component and $v_{gi}=[d\omega/dk]_i$ is the phase velocity of the beam in that component. The phase of the beam at the frequency convertor may therefore be expressed as $\arg(E_{in})+\omega R/c$. After frequency conversion, the beam acquires a phase that depends on the frequency conversion efficiency and a phase representing the propagation of the beam to the target area. The net of these effects is that the phase of the beam in the target area is $\xi+\omega(R+f)/c+\psi W_{fc}$. Controlling this phase may require controlling all of these phases in each beam. Controlling the phases of the time delays and frequency conversion to a fraction of an optical cycle may be prohibitively expensive and technologically challenging. Moreover, without such control, there may be no point in attempting to control the quantum phase $\xi$. Therefore, the multiple aperture laser may not control the relative phases of the beams in the target area.

The beam at the frequency convertor typically has both phase and amplitude variations. In order to optimize the conversion efficiency, it is usually a design requirement that the phase and amplitude variations of the beam at the frequency convertor be controlled. The conversion efficiency is quite sensitive to phase aberrations, yet relatively tolerant of amplitude variations. A diffraction-limited beam at the frequency convertor may be presumed to have a flat phase by design, and a smooth amplitude profile. For conversion from the infrared at $1\omega$ to the ultraviolet at $3\omega$, the variation in local beam direction, $\lambda|\text{grack}\varphi|$ may be limited to $(\Delta\theta_x, \Delta\theta_y)$ in the x- and y-directions, which are numerically a small fraction of the angular acceptance of the crystal in these directions. For tripling 1053 nm light to 355 nm using KDP, typical values for $(\Delta\theta_x, \Delta\theta_y)$ are in the neighborhood of 100 microrad. These limits can be compared with the maximum angular variation that can be tolerated if the beam is to be smaller than the target itself. The angle subtended by the target is r/f, where r is the target radius and f is the focal length of the final focusing lens. This angle is typically about 100 microrad. Therefore, the target size may be the controlling factor in phase variation, rather than frequency conversion. The variation in the beam amplitude tolerable by the frequency convertor can be up to about a factor of 2, so long as the spatial wavelength of the amplitude variations is such that diffraction can be neglected as the beam traverses the crystals. Thus, the smallest spatial wavelength for amplitude variation that can be tolerated by the frequency convertor is typically in the neighborhood of $\sqrt{L\lambda}$, where L is the crystal thickness, or about 100 microns, and the angle associated with this is about 10 mrad. Therefore, to a good approximation, if the beam is to be smaller than the target, the frequency convertor efficiency will not be compromised.

Under these circumstances, and if the $1\omega$ beam at the frequency convertor is relatively uniform in spatial profile, the conversion process can be described by a relatively simple model, where the phase of the $3\omega$ beam may given by Eq. 5:

$$\varphi_{3\omega}(x,y,t)=3\varphi_{1\omega}(x,y,t) \quad \text{(Eq. 5)}$$

and its amplitude may be given by Eq. 6:

$$A_{3\omega}(x,y,t) \propto [A_{1\omega}(x,y,t)]^3 \quad \text{(Eq. 6)}$$

The optical frequency $\omega$, spatial frequency bandwidth $\Delta\kappa$, and the temporal bandwidth $\Delta\omega$ at $3\omega$ are all three times as large as those of the input $1\omega$ beam. (The spatial scale lengths in the $3\omega$ beam tend to be three times smaller than those in the $1\omega$ beam.) Thus, the conversion process may preserve the overall beam divergence $\Delta\kappa/k=M'\lambda/D$, and the fractional frequency bandwidth $\Delta\omega/\omega$. Note that M for the $3\omega$ beam is three times that of the $1\omega$ beam, so $M'\lambda$, is conserved by frequency conversion. Limitations on $\Delta\kappa/k$ or $M'\lambda$, that are derived from the need to optimize the coupling to the target at $3\omega$ can therefore be calculated for the $1\omega$ beam directly using these scaling laws, without explicitly calculating the influence of frequency conversion on the beam spatial and temporal profiles.

Referring now exclusively to the $1\omega$ beam, if the beam is circular and uniform, the spot profiled may be expressed as $[(2/u)J_1(u)]^2$ where $J_1$ is Bessel function, whose first zero lies at radius $1.22\lambda f/D$. This profile contains significant energy outside the first zero. If the $1\omega$ beam is rectangular and uniform, the spot has a $sinc^2$ profile with zeros at $x=\pm\lambda f/D$. This $sinc^2$ profile also has significant energy outside its first zeros. If the complex amplitude is not uniform, the spot profile may become ragged, and its RMS size may increase, for example to $M \lambda f/D$, where M is defined by this equation. Ideally, from the perspectives of both cost and performance, all the energy of the $3\omega$ beam will couple to the target. One way to accomplish this is to arrange for the spot size of an individual laser beam to underfill the target cross-section significantly, making up the required spatial profile of the drive by careful pointing of many undersized spots. This in turn implies that at any point in the focal plane, the N beams are not completely overlapping, so that the effective number of beams that contribute to beam smoothing is somewhat less than N. If the beams under-fill the target cross-section by a factor of 2, so that their spot radius is decreased by $\sqrt{2}$, then the effective number of overlapped beams is also reduced by about a factor of 2, causing an increase in the long-time or asymptotic intensity variation in the focal profile by $\sqrt{2}$. If the beams under-fill the target cross-section by a factor of 9, the asymptotic intensity variation increases by a factor of approximately 3. Thus, there is a trade-off between efficient coupling to the target and asymptotic beam smoothness. Moreover, although an analysis of the trade-off between target coupling and asymptotic smoothness has not been done for IFE targets, an acceptable effective asymptotic smoothness is known to be about 0.25%, and this is eminently compatible with efficient coupling. The effective number of overlapping beams depends on the spot size of each beamlet. Partly overlapping beamlets have important consequences for the statistics of the beam, and we shall return to this topic below.

The spatial profile of a beamlet at the target is related by diffraction to its spatial profile at the amplifiers, and the extraction efficiency of the amplifer is related to the spatial profile of the beam there. The overall system efficiency for an IFE system is a tradeoff between the target coupling and gain and the extraction efficiency of the amplifiers. The optimal spatial profile at the target has a central peak, falls slowly away from the center, and has minimal energy at radii outside of the target radius. The optimal spatial profile will be determined by the well-known principles of diffraction, amplifier extraction and target coupling [Lehmberg2000], and will depend to some extent on the individual beamlet aperture and the target design. It may be determined by the application of these principles to any embodiment. A very effective profile is a $cos^2 \theta$ profile, but the $sinc^2$ profile and supergaussian profiles are both close to optimal.

This situation contrasts with current ICF driver lasers. For Omega [LLE2012] and NIF [Haynam2007], the spatial profile on target is controlled by phase plates which are designed to provide a spatially smooth asymptotic profile with steep edges at the target. Such phase plates typically have large amplitude features over the full aperture while maintaining otherwise diffraction-limited performance. They are challenging and expensive to design and fabricate. For Nike [Sethian'2002], the target profile is controlled by adjusting the profile of the ASE source and imaging this profile to the final focal plane. The amplifiers are typically in the far field of the source, so the beam profile in the amplifiers may be roughly uniform. In embodiments of the multiple aperture approach, it is desirable to minimize the complexity of the lasers, and in a small aperture laser there may be a few spatial modes and further spatial tailoring may not be required. It may be challenging (or even impossible) to tailor the spatial profile of the individual focal spots without also tailoring the spatial profile of the beam in the amplifiers. However, with a large number of beams, such tailoring is greatly simplified and may even be unnecessary. The spot radius of an individual laser, $M'\lambda f/D$, must be less than the target radius, so the aperture diameter D may e determined by Eq. 7:

$$D \geq D_0 \equiv \frac{M'f\lambda}{2r} \qquad (Eq. 7)$$

Figure 10:
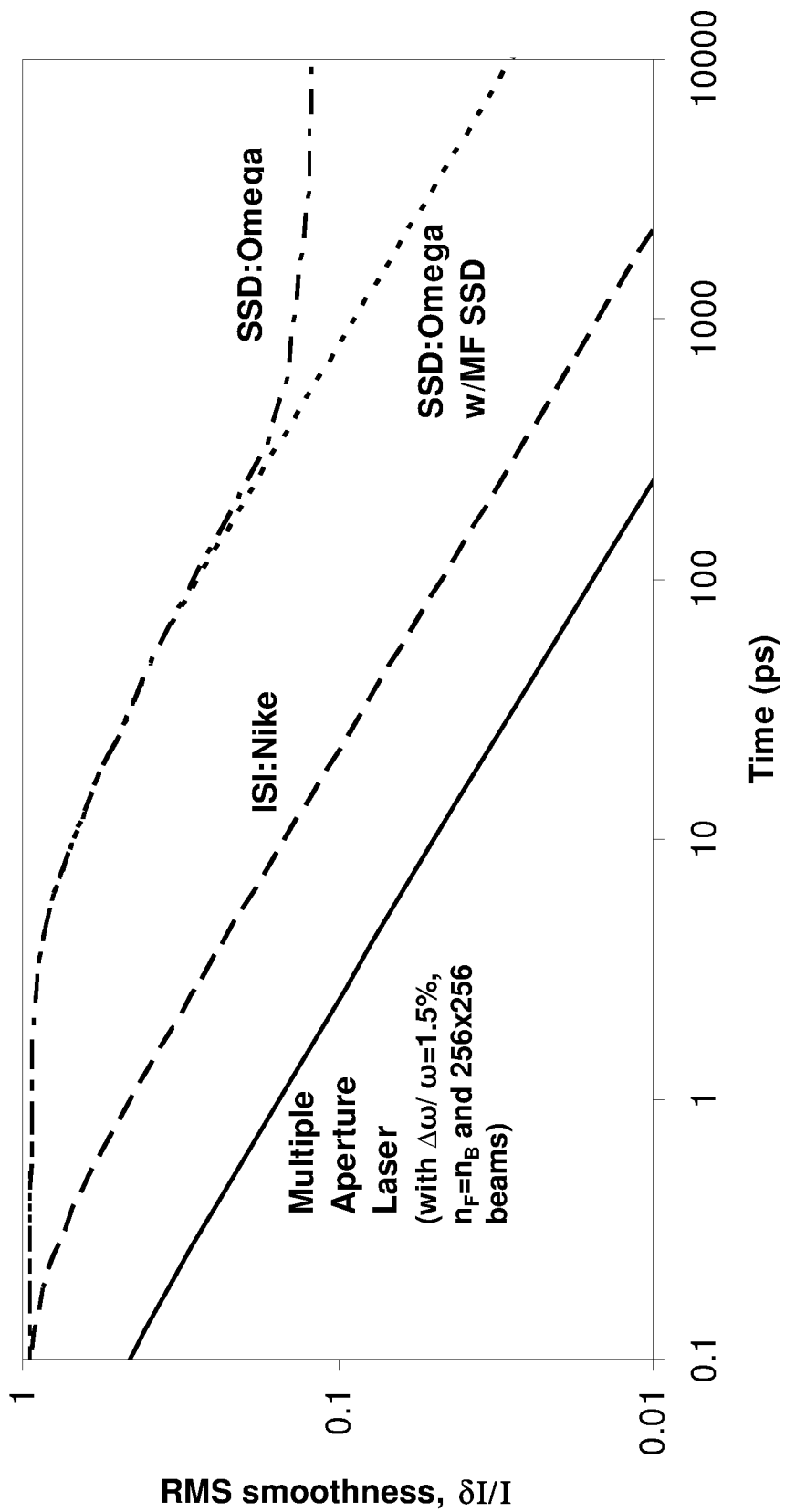
FIG. 10 illustrates the smoothness of the laser drive at the target as a function of time, comparing prior driver lasers with an embodiment as described herein.

The relevant target radius may be the initial radius, or the radius at ignition, which is smaller. Using the initial target radius r=0.5 mm, f=10 m, and $\lambda=\frac{1}{3}$ μm, D is about 10 mm for a uniform beam profile. The fluence of the beam at the $3\omega$ optics specifies the total beam area at $3\omega$. If the energy delivered to the target is E, and damage threshold of the optics at $3\omega$ is $J_d$, the number of beams must satisfy Eq. 8:

$$N \geq \frac{E}{\pi D^2 J_d \eta_T} \qquad (Eq. 8)$$

for circular spots or Eq. 9:

$$N \geq \frac{E}{D_x D_y J_d \eta_T} \qquad (Eq. 9)$$

for rectangular spots, where $\pi_T$ is the coupling efficiency of the laser output energy at $3\omega$ to the target. The minimum number of beamlets and beamlet aperture is plotted in FIG. 1. The minimum number of beamlets decreases as the beamlet aperture is increased. The maximum number of beamlets should be selected so that the beamlets irradiate the target efficiently without the need for coherent addition. The overall system efficiency has a broad optimum centered on a beamlet aperture of 5 cm. Also shown in FIG. 1 is an inset of a portion of the data plotted in FIG. 10, showing the beam smoothing achievable with a multiple aperture laser system.

The cost of the laser system scales with both the number of beams and the beam aperture. One model of the cost scaling is as follows in Eq. 10:

$$C = c_{ref}\left(\frac{N}{N_{ref}}\right)^{p_N}\left(\frac{D+D_m}{D_{ref}+D_m}\right)^{2p_D} \qquad (Eq. 10)$$

where the subscript "ref" denotes a reference design point. $D_m$ represents the fact that even a laser of vanishing aperture has costs associated with the hardware. In this model, the cost scales as a power of N and a power of $(D+D_m)$. The constant $C_{ref}$ refers to the cost of the reference design, using the future technologies that will be available at the time in the future when the laser is constructed. While it is highly speculative to build a cost model without a laser design and in the absence of insight into future innovations and manufacturing technologies, some comments can be made. First, the high level of modularity in the multi-aperture concept and the common features with diode and semiconductor technology suggest that the constant $C_{ref}$ will be significantly smaller for embodiments of the multi-aperture laser than for existing laser concepts. Secondly, as one varies the number of beams and the beam apertures within this future technology, one may possibly estimate the scaling law exponents from related technologies as in the range of about 0.5 to 0.7. Note that $ND_xD_y$ is fixed by the 3ω damage limit of the optics. So if the fluence of the beams at the 3ω optics is held constant, N and D scale oppositely. Consequently the (future) cost may not vary significantly as the number of beams is varied. Thirdly, the costs of diode lasers have been dropping rapidly as the diode laser industry develops. It is not unreasonable at this time to project diode costs in the range of a few cents/Watt in a fusion power economy. This suggests a cost model where (a) the most significant (future) cost savings are obtained by using advanced laser technologies, especially future diode production costs, and (b) that the (future) cost depends mostly on the damage threshold of the 3ω optics and varies little with the number and apertures of the laser beams. Both these statements about future costs are suggestive at best in the absence of a specific laser technology and laser design in hand.

The flexibility in configuring the beams around the target is demonstrated by noting that if the N beams are gathered into a tightly packed cone when viewed from the target, the cone angle α is small, as given in Eq. 11 below:

$$\alpha \approx \frac{1}{f}\sqrt{\frac{E}{\pi J_d}} = \frac{D}{f}\sqrt{N} \quad \text{(Eq. 11)}$$

For E=0.5 MJ for two-sided illumination, $J_d$=4 J/cm², and f=10 m, the minimum cone angle is approximately 0.22 radians~13 degrees. Any configuration between this tight cone to uniform distribution over 4π steradians may be selected.

In various embodiments, a large number of lasers may be configured in an appropriate angular distribution so that their output beams are directed to a small target volume, typically about 1 mm³, such that the distance between the final optical element of each beamlet is several meters away. The distance from the exit aperture of each beamlet to the target volume is determined by three main requirements. First, the total solid angle subtended by all the beamlets at the target must be significantly less than 4π steradians. Second, the total area of all the beamlets must be larger than $E/J_d$, where E is the total laser energy delivered to the target volume on each pulse and $J_d$ is the threshold for optical damage of the last few optical elements comprising a beamlet. Third, the exit apertures of the beamlets can be at any appropriate locations throughout the target chamber, consistent with the minimum cone angle discussed above, and the need to allow for the collection of energy released by the capsule. In one embodiment, the exit apertures may be placed within one of a small number of cones, called the IFE cones. As discussed below, precise configuration of the beamlets may be set by the requirements for adequate or optimal release of energy from the target after irradiation by the beamlets.

In one target concept, known as indirect drive, a spherical target is contained in a cylinder of radius about 2 mm and height 4 mm, with two small holes in its flat sides approximately 1 mm in diameter. The laser light enters the holes and impinges on the inside surface of the cylinder, causing the release of X-rays which cause the target to implode and the nuclear fuel contained within the target to release nuclear energy. For indirect drive, approximately half of the beamlets may be placed so that their direction of propagation lies in a cone so that they enter one of the two holes in the cylinder with very little light hitting the outside surface of the cylinder. The remainder of the beamlets may lie in an almost identical pattern in a second cone such that they enter the other hole in the cylinder. The two cones may have almost the same cone angle, their apical points coincident, and their axes coincident and oppositely directed. This is known as the two-sided indirect drive configuration. The two IFE cones typically have a half-cone angle of less than 20 degrees so that the total solid angle of all the beamlet apertures taken together is significantly less than 0.5 steradians.

In another target concept, known as polar direct drive, a spherical or nearly spherical target is again contained in a similar cylinder, and the beamlets are arranged so that they enter the holes, but in this case, they impinge directly on the target containing the nuclear fuel. The beamlets are again laid out in two cones so that so that they are evenly divided between two cones, but the cone angles are typically considerably smaller to ensure that every beamlet impinges directly on the target. The cone angle for polar direct drive is typically less than 10 degrees.

In yet another target concept, known as direct drive, a spherical or nearly spherical target is directly illuminated by the beamlets, and the beamlets are arranged around the target in a spherical or equivalently spherical configuration in which the number of beamlets per steradian of solid angle is approximately the same for any group beamlets. The configuration for direct drive may also group the beamlets into several cones, such that all the cones have the same apex, but their axes are distributed approximately spherically around the target. A further possible variation on the illumination geometry places the beamlets in a small number of cones, all with (almost exactly) coincident apices, but whose axes are not distributed spherically around the target. In this case, the sum total of all the pulses delivered by the beamlets causes the target to execute a controlled approximately spherical implosion, despite the nonspherical arrangement of beamlets around the target.

It is clear that many configurations of beamlets around the target are possible, and various embodiments may include all possible arrangements of beamlets.

In order to achieve the efficient release of nuclear energy from the target, the sum total of all the pulses typically must meet certain strict requirements. These originate in the need to accelerate the compression of the target in an optimal manner, the need to have a small volume of fuel at high temperature and pressure at the stagnation point, the need to prevent the growth of deleterious instabilities in the capsule during compression, and the need to avoid laser plasma instabilities. These requirements are known as temporal pulse shaping, spatial profile shaping, beam smoothness to avoid the Rayleigh-Taylor and other instabilities, and suppression of laser-plasma instabilities (LPI). Reasonably precise control of the features of the laser light from the beamlets is required.

Typically, previous and proposed approaches to designing driver lasers for ICF have used a moderate number of beams, such as 192 (NIF) [Haynam2007] or 240 (LMJ) [Bettinger1999], each one producing a very similar pulse. Each beamlet is tailored precisely to meet the target requirements. Given the challenges and constraints of laser technology, compromises must typically be made. In various embodiments, each beamlet is independently specified. This results in extreme flexibility in adjusting the features of the total laser drive on the target. In various embodiments, it is possible to have simultaneous properties of the total drive at the target which are either impossible or very difficult to deliver from a single large aperture. In the preferred embodiments, this flexibility is exploited to facilitate the best performance of any previous or proposed driver laser.

The embodiments described herein take advantage of the extreme flexibility of the embodiments in regard to the beamlets' individual pulse shape, wavelength, bandwidth, temporal sequencing, and focusing.

In the first preferred embodiment, there are 66000 beamlets, divided into two cones of 33000 beamlets. The beamlets are configured for two-sided illumination using cone angles of 24 degrees. The beamlet apertures are packed as close together as practical within the two IFE cones, and respecting the minimum area of each aperture arising from optical damage prevention. Each beamlet produces a light pulse that is monochromatic and spatially uniform or supergaussian at its exit aperture. While not required in general, in this embodiment the temporal pulse shape of the beamlets pulses are the same and timed to arrive at the target essentially simultaneously. The wavelengths of the individual beamlets are distributed randomly over a range of 1.5% of their average wavelength, which is approximately 300-400 nm, or 15 THz. In this embodiment, the δI/I of the laser intensity at the target drops rapidly as τ/t, where the time constant τ is about 35 fs, and asymptotically the smoothness is zero. The total bandwidth of the laser light is about 15 THz. This distribution of wavelengths is achieved by selecting suitable laser gain media for each beamlet individually. Suitable laser gain media are those which collectively support 15 THz of bandwidth for the ensemble of beamlets that comprise the embodiment. The laser gain medium for each beamlet is selected to give the desired parasitic-free performance at its assigned wavelength. Ideally, the distribution of frequencies among the beamlets is close to uniform so that there are no significant gaps in the total spectrum delivered by the embodiment. In this embodiment, the wide range of frequencies is provided by a selection of diode-pumped Nd:Glass laser gain media. Flashlamp and diode-laser-pumped Nd:Glass gain media are well known in the art of ICF and generally have significant gain bandwidths. The total bandwidth of 1.5% can be covered with just a few glass media, typically phosphate, silicate and aluminate glasses, which together operate over a total wavelength range extending from about 1070 nm down to about 1030 nm. Glass laser media spanning the desired frequency range have been developed recently at Schott, North America under a private contract and are expected to become available in time for use in a future embodiment of the laser system. There is a small loss in efficiency for those beamlets not operating at the frequency of peak gain for its gain medium. However, a beamlet may be operated at a frequency where its gain is half its peak gain without an unacceptable loss in efficiency. The beamlets are frequency-converted to the UV for optimal target coupling.

Other choices for laser gain media are possible. There are two types of ceramic laser gain media: (a) transparent crystalline ceramics formed by dense, doped microcrystals, and (b) a transparent glass ceramic comprising a glass matrix with dispersed microcrystals doped with transition metals. Such media have been demonstrated at small scale with attractive properties for this application and there is no known impediment to making them at the required scale of several centimeters. Another potential gain medium is $Nd:SiO_2$, Neodymium-doped fused silica. This material has a high damage threshold, a bandwidth in excess of 2%, and a reasonable gain cross-section, so that the material can operate with adequate efficiency at pulse lengths of several nanoseconds, and at the same time support a total bandwidth of 15 THz.

Diode-laser-pumped Nd:Crystal laser media are also well-known in the art but typically have narrower gain bandwidth than Nd:Glass laser media so that a greater number of different media are required to cover the desired wavelength range. Achieving a uniform spectrum using crystalline gain media will require many different gain media, possibly based on existing gain media with additional dopants to shift the peak gain wavelength. The small aperture of each beamlet may enable a larger range of laser/host materials to be exploited in our approach. Manufacturing difficulties associated with large apertures (D>10 cm) are well known in the ICF community, and methods for developing manufacturing processes are also well-known.

The extraction efficiency of a laser amplifier, and the relationship between the input and output pulse shapes, vary with the optical frequency of the laser pulses. Far from the peak of the gain profile, the amplifier transfers energy to the laser pulses inefficiently compared to the efficiency for operating at that peak. In general, Frantz-Nodvik theory indicates that the efficiency is acceptable for optical frequencies within the FWHM of the gain profile. In embodiments of the multiple aperture approach, we envision groups of beamlets each containing the same laser gain medium, but operating at different optical frequencies. For example if there 50,000 beamlets and just 10 gain media, then there may be 10 groups of approximately 5000 beamlets with the same gain medium. Within any one group, each beamlet may operate at a different optical frequency, with the efficiency and pulse shape distortion appropriate to its individual frequency.

There are several approaches to managing the variations in efficiency and pulse shape distortion among the beamlets. In the preferred approach, each amplifier in a group is pumped to the same energy density, and the input pulse energies and pulse shapes are also the same. Then, the output pulse energy and output pulse shape vary throughout the group. Because there are very many beamlets in the group (~5000), the variation in the output of each beamlet averages out at the target. The gains and pulse shapes are adjusted so that the total drive at the target meets the requirement. Other approaches are also possible, for example, where the pumping and input pulses are individually adjusted among the beamlets to provide a more uniform distribution of pulse formats at the target. There is clearly great flexibility in configuring each amplifier to accommodate an optical frequency off the peak of the gain curve. Accordingly, all such variations and approaches are deemed within the scope of the embodiments.

In an embodiment, each beamlet has a MOPA configuration wherein its laser oscillator is tuned to provide its assigned infrared wavelength. The output of the infrared laser is frequency-converted to the ultraviolet using standard nonlinear-optical techniques such as frequency tripling in KD*P or frequency doubling in YCOB. The conversion efficiency can be high because the bandwidth of each beamlet is narrow and its beam quality is high in view of the need to focus on a small target several meters away. The laser gain medium and the oscillator gain medium are matched for each beamlet so that the wall-plug efficiency of each beamlet is not compromised by having a peak gain wavelength somewhat different from the operating wavelength. Even though each beamlet has an individual wavelength different from all the others, beamlets with wavelengths close together can use the same gain medium, depending on the gain bandwidth of the available media.

In the embodiment, the pulse at the exit aperture of a beamlet at its exit aperture is relatively flat temporally, supergaussian spatially, and narrowband. The frequency-conversion efficiency for such pulses is about 90% to the visible and 80% to the ultraviolet. This is a considerable improvement over present and proposed approaches where each beam delivers the same shaped pulse, and where the frequency conversion efficiency is around 55%. Thus in various embodiments, the infrared energy of all the beamlets before frequency conversion is about 70% of the infrared energy needed in present and proposed lasers for ICF and IFE.

Because the driver laser will deliver several pulses per second, the laser amplifiers should be designed to efficiently remove the heat generated by the laser amplification process. Crystal lasers typically generate significantly less heat than glass lasers, require less powerful pump sources, and are more efficient at transporting heat out of the amplifier. Thus, they can handle the heat more gracefully than glass lasers. Ceramic glass lasers also have attractive and adequate thermal properties. In practice, there is a trade-off between the number of gain media and the repetition rate of the driver laser. Other combinations of gain media are also possible in various embodiments. Glass, ceramic and crystal laser media can be used in different beamlets, and this may prove to be an attractive cost-effective option for some or all of the beamlets. The small aperture is more readily amenable to efficient cooling for operation at 5-15 Hz repetition rate.

In another embodiment, the beamlet wavelengths are not distributed randomly but carefully selected and implemented. This configuration improves the smoothing rate for long wavelength spatial modes of the intensity near the target. This embodiment exhibits extreme flexibility of the laser system.

In general, the beamlets approach the target from different directions; two beamlets separated in beam direction by an angle $\theta$ have an optical interference pattern with period $\Lambda = \lambda/\sin\theta$. The rate at which these spatial periods are smoothed depends on the beat frequency between the two beamlets. Thus, by carefully selecting the distribution of the frequencies among the beamlets, the rate of smoothing of the spatial periods in the total laser drive at the target can be controlled. This control does not exist in conventional approaches such as NIF-style lasers. Long spatial periods are associated with beams that are close in beam direction, and shorter periods with beamlets that are more distant from each other. A distribution of frequencies in which beams with nearly equal frequencies are generally widely separated in beam direction may smooth the longest spatial frequencies, or lowest L-modes of the total drive, the fastest. If the distribution has beamlets with similar frequencies close in beam direction, then the lowest L-modes may not smooth rapidly. Thus, it is possible to control the most persistent L-modes in the total drive by carefully adjusting the distribution of frequencies among the beamlets. The correlation between frequency and beam direction is a new feature the embodiment that does not exist in conventional approaches such as NIF-style lasers.

One way to view the correlation between frequency and beam direction is to describe it as a tiling of the $\kappa$-space of the local field of the drive. Each beamlet contributes one "tile" to the $\kappa$-space of the local field. Each Fourier component $I(\kappa,t)$ of the intensity at the target is a convolution of the field with itself. It therefore oscillates at the beat frequencies of the pairs of beams that contribute to that Fourier component. Different distributions of frequencies among the beamlets lead to different frequencies in $I(\kappa,t)$. Hydrodynamic and laser plasma instabilities are strongly dependent on the frequency content of $I(\kappa,t)$, and therefore can be controlled by the distribution of frequencies among the beams. This is a fundamental mechanism by which embodiments have the flexibility to control the deleterious instabilities in the ICF target.

Another fundamental mechanism by which smoothing and LPI may be controlled is simply through the statistical averaging of $I(\kappa,t)$ over a large number of beamlets. On any given shot, the absolute phase between the beamlets varies randomly because the absolute phase derives from quantum noise in the oscillators that provide the seed pulses for the beamlets. There will be shot-to-shot variations in the laser drive as the beamlet phases change from shot to shot. With a large number of beamlets, both the average value of $<I(\kappa,t)>$ and its variation from shot to shot are reduced, typically as $1/\sqrt{N}$. Shot-to-shot variations in conventional ICF systems use seed pulses that are derived from a single oscillator and the role of the quantum phase of that oscillator is benign. Rather, shot-to-shot variation in conventional systems derives from random fluctuations in the control parameters of the laser. With a few hundred beams, the statistical averaging is only a factor of 20 or so, but with several thousand beams, as in the embodiments described herein, the statistical averaging can be as much as a factor of hundred. This ameliorates the tolerances on the control parameters of the beamlets, with cost savings and improved stability of the laser drive from shot to shot.

In the embodiment, the seeding of hydrodynamic instabilities and the growth of laser plasma instabilities are controlled by the smoothing rate and the total bandwidth of the ensemble of beamlets. Both of these instabilities depend on the spatial frequencies in the electric field of the laser drive, and on their frequency content. Some spatial frequencies are more problematic than others. For example, the hydrodynamic instabilities are most virulent at spatial scales of 10-30 microns, which corresponds to the interference between beamlets separated by about 10-30 milliradians (roughly 1 degree). By arranging for beamlets separated by this angle to have significantly different frequencies, the most harmful hydrodynamic spatial frequencies in the drive can be reduced.

Figure 15:
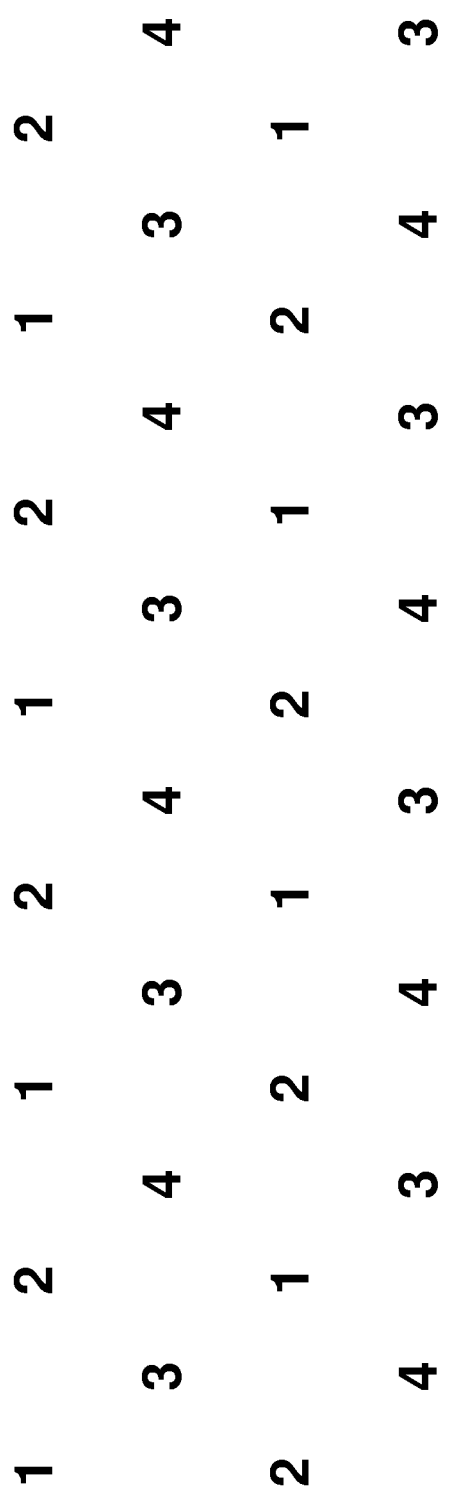

For illustrative purposes, a distribution of the frequencies among the beamlets that reduces the low L-mode terms in the laser drive is given in FIG. 15, which illustrates a spatial spectrum of a group of beamlets, according to an embodiment. Consider a hexagonal arrangement of beamlet exit apertures. Each beamlet has a spatial spectrum of size kD/f, where $k=2\pi/\lambda$, D is the beamlet aperture, and f is the focal length of the lenses focusing the beamlet on the target.

Figure 14:
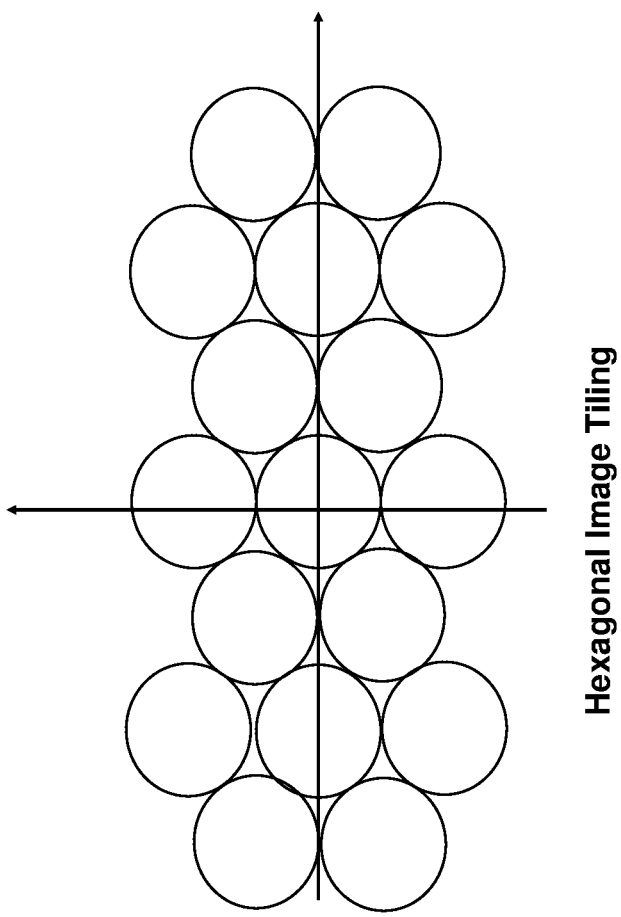
FIG. 14 illustrates a spatial spectrum of a group of beamlets, according to an embodiment.
Figure 17:
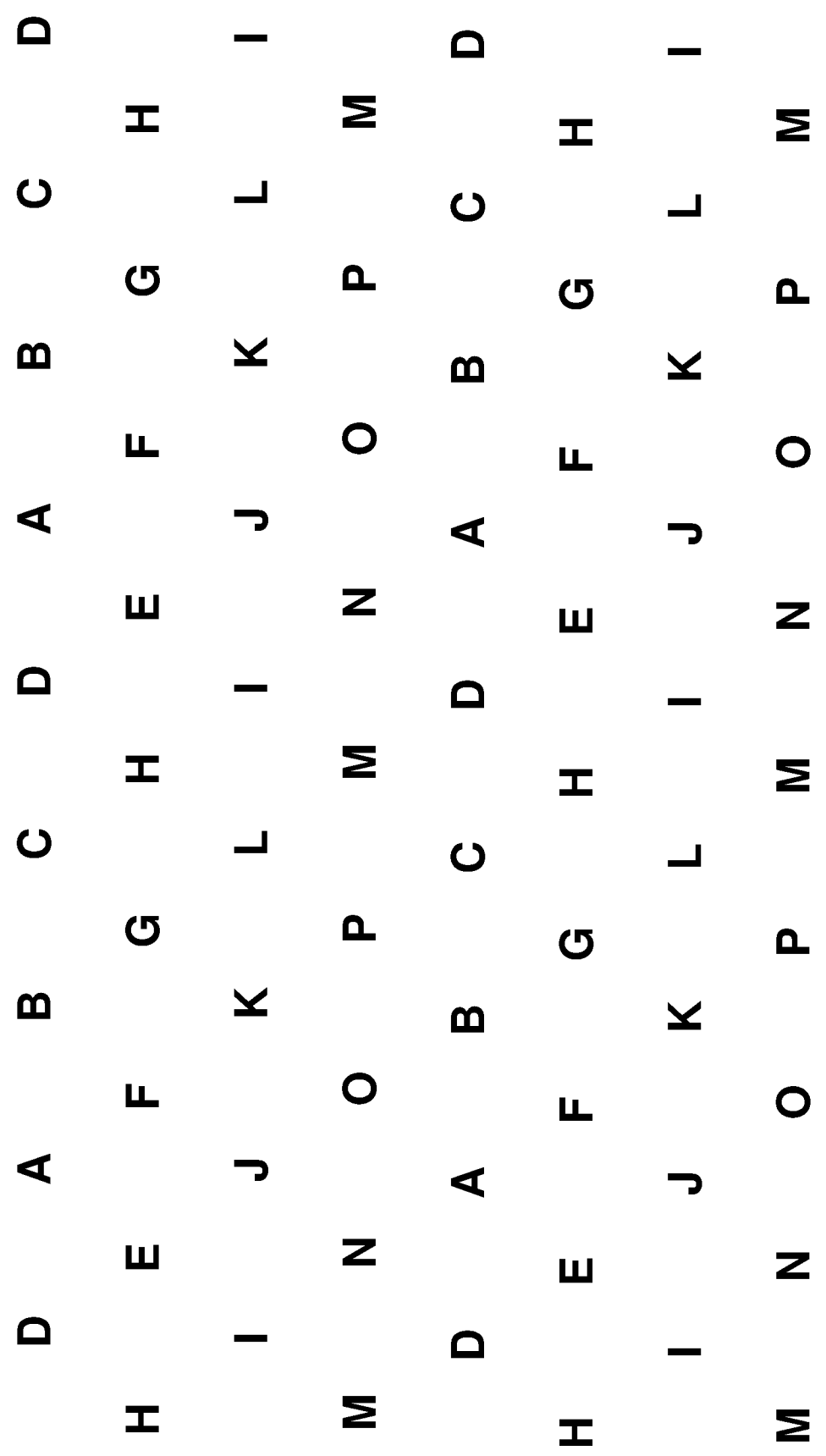

The spatial frequency spectrum of the beamlets at the target is represented in FIG. 14. FIG. 15 illustrates an exemplary pattern of spatial frequency spectrum of four frequencies. FIG. 16 illustrates an exemplary pattern of spatial frequency spectrum of nine frequencies. FIG. 17 illustrates an exemplary pattern of spatial frequency spectrum of sixteen frequencies. The "tiling" of the $\kappa$-space, one tile per beamlet, is evident. Each circle is an image of a beamlet in κ-space. The intensity spectrum is the convolution of this pattern with itself, in a manner well-known to practitioners of the art of ICF. With just four frequencies arranged in the pattern as shown in FIG. 15, no image is next to an image of the same frequency.

The separation between any image and the nearest image at the same frequency is one image diameter. With nine frequencies arranged in the pattern shown in FIG. 16, the separation is two image diameters.

Therefore, it is quite possible to arrange for all the cross-terms in the convolution to average to zero, for κ up to about twice the size in κ-space of an individual beam image. The convolution representing the spatial spectrum of the intensity has reduced low L-modes.

The pattern of all the 1's or 2's etc. among the beams determines the strongest spatial modes in the intensity. A distribution which controls the spatial frequency represented by all the 1's or 2's etc. can easily be constructed by using sixteen frequencies instead of nine, as illustrated in FIG. 17.

Clearly there is a vast number of combinations and arrangements of the frequencies among the beams. The arrangement given here illustrates the principles by which the distributions most attractive for beam smoothing can be discovered. The number of frequencies and their distribution among the beamlets may depend on the exact values of the angular separation of the beamlets and the most harmful spatial scales $\Lambda_0$. In general, the minimum number of frequencies required to create the desired distribution in the illustration is approximately $(\Lambda_0/\lambda)^2$. However, the asymptotic smoothness is essentially the inverse of the square root of the number of different frequencies. Therefore, it may be advantageous to have at least 10,000 frequencies to meet the asymptotic smoothness requirement of ICF. If each beamlet is single frequency, as in this embodiment, this would be a primary reason for a large number of beamlets. If beamlets are chosen to have several frequencies, the number of beamlets can be reduced accordingly, with attendant consequences for the spatial spectrum of the intensity at the target.

Other methods of determining and evaluating useful distributions of the frequency among the beams, and the implementation of this method will be well understood by practitioners of the art of ICF, and do not require further elaboration here. All distributions, whether obtained by this method or any other, are deemed within the scope of the embodiments.

Moreover, the laser plasma instability known as stimulated Brillouin scattering (SBS) is most harmful for back-scattered light and depends on the persistence of a density grating in the plasma. SBS is relatively insensitive to the spatial frequencies in the laser drive, but it is very sensitive to the total bandwidth. Bandwidths as small as 1 THz can be effective in controlling backward SBS. Embodiments are capable of bandwidth of 10-50 THz subject to the availability of suitable laser gain media, and so offer the possibility of eliminating SBS in the target through the total bandwidth. Similarly, stimulated Raman scattering (SRS) is most harmful for side-scattered and back scattered light, and depends on the persistence of a grating in the electron density of the plasma. It is sensitive to bandwidth just as SBS is, but its suppression requires bandwidths well in excess of 5 THz. Embodiments also offer the possibility of controlling SRS through total bandwidth.

The $2\omega_{pe}$ instability occurs at exactly quarter-critical electron density, which occurs in a small region of the plasma, which depends on the laser frequency. If the laser has bandwidth, the location where the instability occurs is spread out, and the growth rate of the instability is reduced. Embodiments have the capability to achieve bandwidths well in excess of any other ICF driver laser, and are capable of suppressing this instability through the total bandwidth. Other harmful effects in the plasma such as hot electron production can also be controlled by bandwidth through essentially the same mechanism of spreading out the region of the plasma where these effects occur.

A full description of these instabilities and the effect of bandwidth and the smoothing of the spatial frequency spectrum on them is omitted because the many theoretical models and experimental tests of these instabilities are well-known to practitioners of ICF and they will be able to calculate the benefits the embodiments in regard to the high smoothing rates, low asymptotic smoothness, and LPI suppression.

The benefits of the embodiments and their flexibility have been described here in general terms readily appreciated and evaluated by practitioners of the art of ICF. In the embodiments, total bandwidth controls the rate of smoothing and suppresses deleterious plasma effects, and the distribution of frequencies among the beams controls the smoothing rate and the asymptotic smoothness. The description given here, while somewhat foreshortened, and the methods of discovering useful distributions will nonetheless be adequate to guide practitioners of the art of ICF in the beneficial use of the invention as defined by the following claims. [See for example, Lehmberg2000].

The use of very many beamlets provides cost and operations advantages. The beamlets may share power supplies, control systems, and diagnostic equipment which reduces the mass of the support systems required to operate the driver laser system and therefore reduces the cost and operational complexity. The beamlets may be physically grouped where each group can be independently changed out for maintenance, replacement, and refurbishment of the laser hardware. Target irradiation operations may not require that the IFE cone be fully filled. Removing a small number of beamlets from an IFE cone can be compensated straightforwardly by adjusting the power of the remaining beamlets. The beamlets can therefore be arranged in groups so that turning off any group can be compensated by adjusting the output of the remaining beamlets in the IFE cone. This enables preserving driver laser performance during maintenance operations. With very many beamlets, the equipment overhead required to maintain continuous target irradiations operations during maintenance operations is small, thus reducing the cost of the driver laser system. The maintenance groups can consist of as few as one beamlet, or a small number of beamlets.

In another embodiment, the beamlets are time-sequenced so that only a portion of the beamlets pulses irradiate the target at any one time. The first few nanoseconds of the target drive are provided by about 5,000 beamlets, each producing the same temporal pulse shape of about three nanoseconds in pulse length, the same wavelength, and minimal (individual) bandwidth. This group of lasers may operate in the infrared, with no frequency conversion to the ultraviolet, and has a (group) bandwidth of about 1%. The bandwidth suppresses the imprinting of spatial nonuniformity in the target. Laser-plasma instabilities are not present at this time in the target response due to the size of the plasma and the low intensity on target, so no means of suppressing them is required. During the next approximately twenty nanoseconds, about 35,000 beamlets deliver pulses to the target. Each beamlet's pulse is temporally shaped so that the total laser power at the target changes steadily over time, generally increasing to provide the desired implosion time history for the target capsule. The wavelengths of the beamlets are initially in the infrared, but as the implosion process proceeds, the pulses are delivered from frequency-converted beamlets so that the wavelength of the laser light at the target moves from the infrared to the ultraviolet. Some beamlets are converted to the second harmonic in the visible; others are converted to the third harmonic in the ultraviolet. The group bandwidth of the beamlets operating in the infrared remains at about 1%. The group bandwidth of the beamlets operating in the visible may be smaller but the group bandwidth of the ultraviolet beamlets is about 1.5%. The beamlets operating later in the target implosion are focused a little behind the beamlets operating earlier in the target implosion process (i.e., they have longer focal length), and their spot size is smaller. This compensates for any change in size of the target during the implosion process (so called beam zooming). Finally, the remaining 26,000 beamlets deliver their pulses to the target. Each beamlet in an IFE cone delivers a flat temporal pulse shape of about 3-5 ns in pulse length, is focused to a common point, and is frequency-converted to the ultraviolet. The total (group) bandwidth is about 1.5%. Thus the color, bandwidth, focal length, and focal spot size of the complete laser drive at the target are finely adjusted during the target implosion process to optimize the laser drive pulse shape at the target, while avoiding hydrodynamic and laser-plasma instabilities.

Clearly, any property of a laser beam can be distributed among the beamlets. Many combinations are possible, with different properties distributed differently. Beamlets close in frequency may have a range of focal lengths, polarizations, and pointing, so that these properties of the total drive are not correlated to frequency. Or beamlets close in frequency may be assigned the same focal length, and/or polarization, providing a high degree of correlation with frequency. The distribution of beam properties among the beamlets and the distribution of frequency among the beamlets may control the property's temporal and spatial characteristics. The number of permutations of the beamlet parameters is virtually unlimited.

In this way, the embodiments maximize the release of nuclear energy, minimize the size of the driver laser, and optimize the ratio of nuclear energy released to the total laser energy delivered to the target.

These two embodiments represent the simplest implementations of various embodiments, and a more complex implementation of various embodiments. The benefits described are enabled by the use of many small beamlets to give flexibility, cost effectiveness and operational efficiency to an ICF driver laser or an IFE driver laser. Clearly there are many embodiments that take advantage of having very many beamlets and utilize one or more of the methods described herein. All of these embodiments are deemed to lie within the scope of the invention as defined by the following claims. However, the embodiments should not be construed as limiting, because the disclosed embodiments are only exemplary and provided to illustrate the principles of the invention to the understanding of those of ordinary skill in the art.

Figure 2:
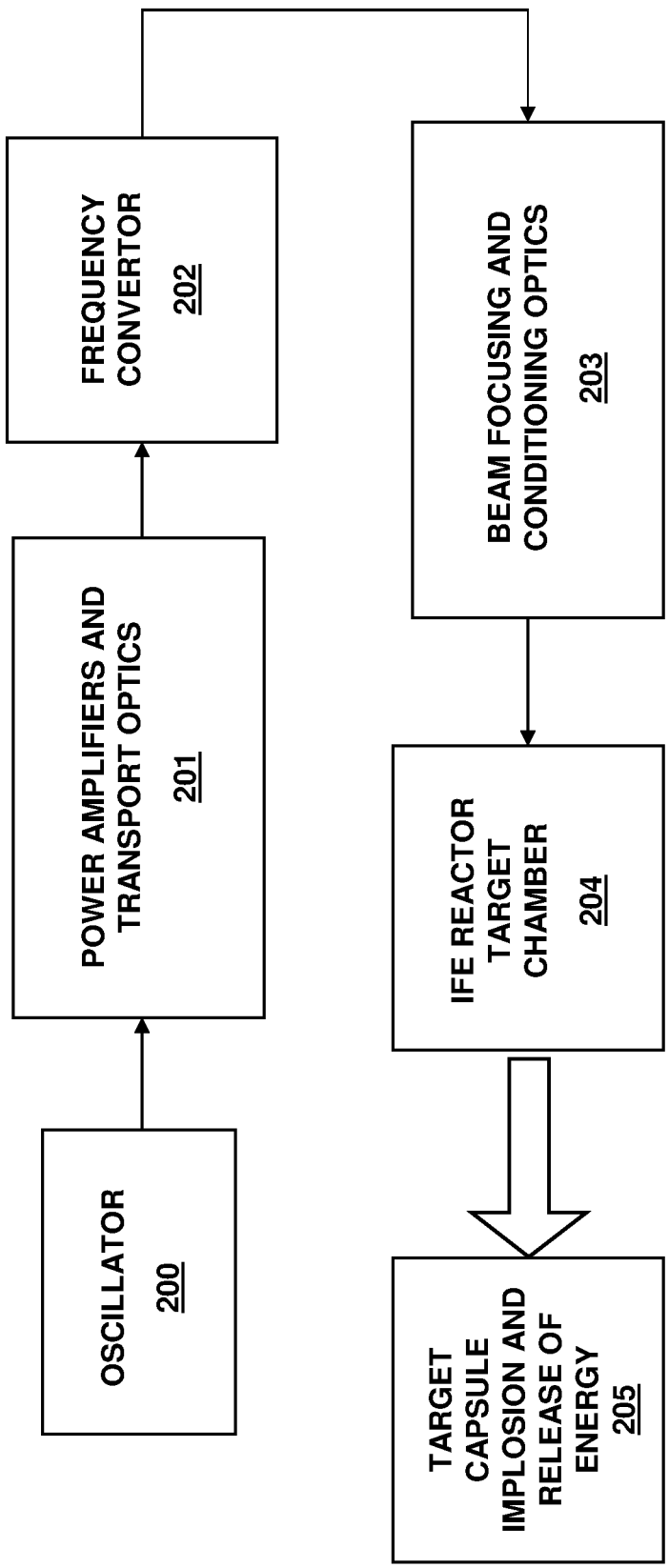
FIG. 2 illustrates elements of a driver laser and reactor for an IFE power plant and the general path followed by a pulsed laser beam in the IFE power plant, according to an embodiment.

FIG. 2 illustrates elements of a driver laser and reactor for an IFE power plant and the general path followed by a pulsed laser beam in the IFE power plant. The laser pulse is generated in an oscillator 200, amplified in a series of power amplifiers and transport optics 201, passes through a beam focusing and conditioning optic 203, and enters the IFE reactor target chamber 204. The laser pulse may be frequency converted in a frequency convertor 202. The result of the laser pulse impinging on a target is target capsule implosion and release of energy by the target, 205. The oscillator 200 creates a small energy laser pulse, typically in the range of nanojoules, with the desired temporal and spatial features. The power amplifiers and transport optics 201 increase the energy of the pulse and maintain adequate beam quality so that the beam focuses tightly downstream on the target. The frequency convertor 202, if present, converts the wavelength of the laser pulse as far to the ultraviolet as is required by the target, typically 250-550 nm. The beam focusing and conditioning optics 203 focuses the beam onto the target and also adds carefully designed spatial structure so that the spot size at the target matches the target size and also provides a smoothly tailored spatial profile to control the low L-mode terms in the implosion pressure on the target. The laser may be configured to deliver pulses to the target at a rate up to about 20 Hz.

Figure 3:
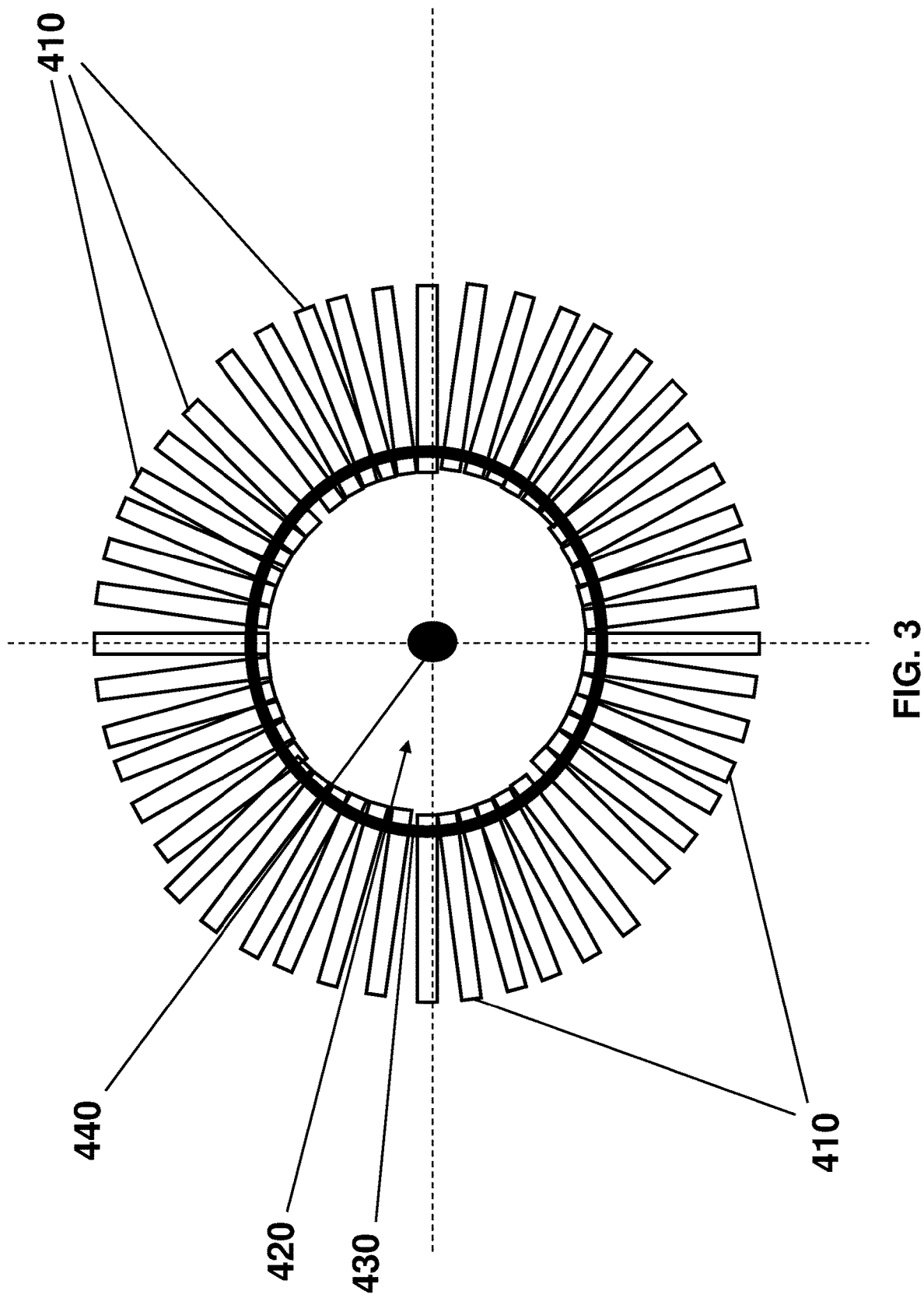
FIG. 3 illustrates a spherical arrangement of beamlets around a target chamber, according to an embodiment.

FIG. 3 illustrates a spherical arrangement of beamlets 410 around a target chamber, whose wall is denoted 430. An interior region of the target chamber 420 may be at a high vacuum, typically 0.01 torr, and contain the target 440 nominally at its center. As FIG. 3 illustrates, some portions of the laser subsystems comprising the beamlets 410 reside on an interior side of the target chamber wall 430 in the interior region of the target chamber 420, but other portions of the laser subsystems comprising the beamlets 410 remain outside the target chamber wall 430. FIG. 3 shows the beamlets 410 arranged in a symmetrical arrangement so that the beamlets 410 occupy positions spanning the full $4\pi$ solid angle available at the target 440. Any portion of solid angle not occupied by any beamlet 410 may be used to collect the high energy particles released by the target implosion. The spherical arrangement is a preferred arrangement for direct drive targets.

Figure 4:
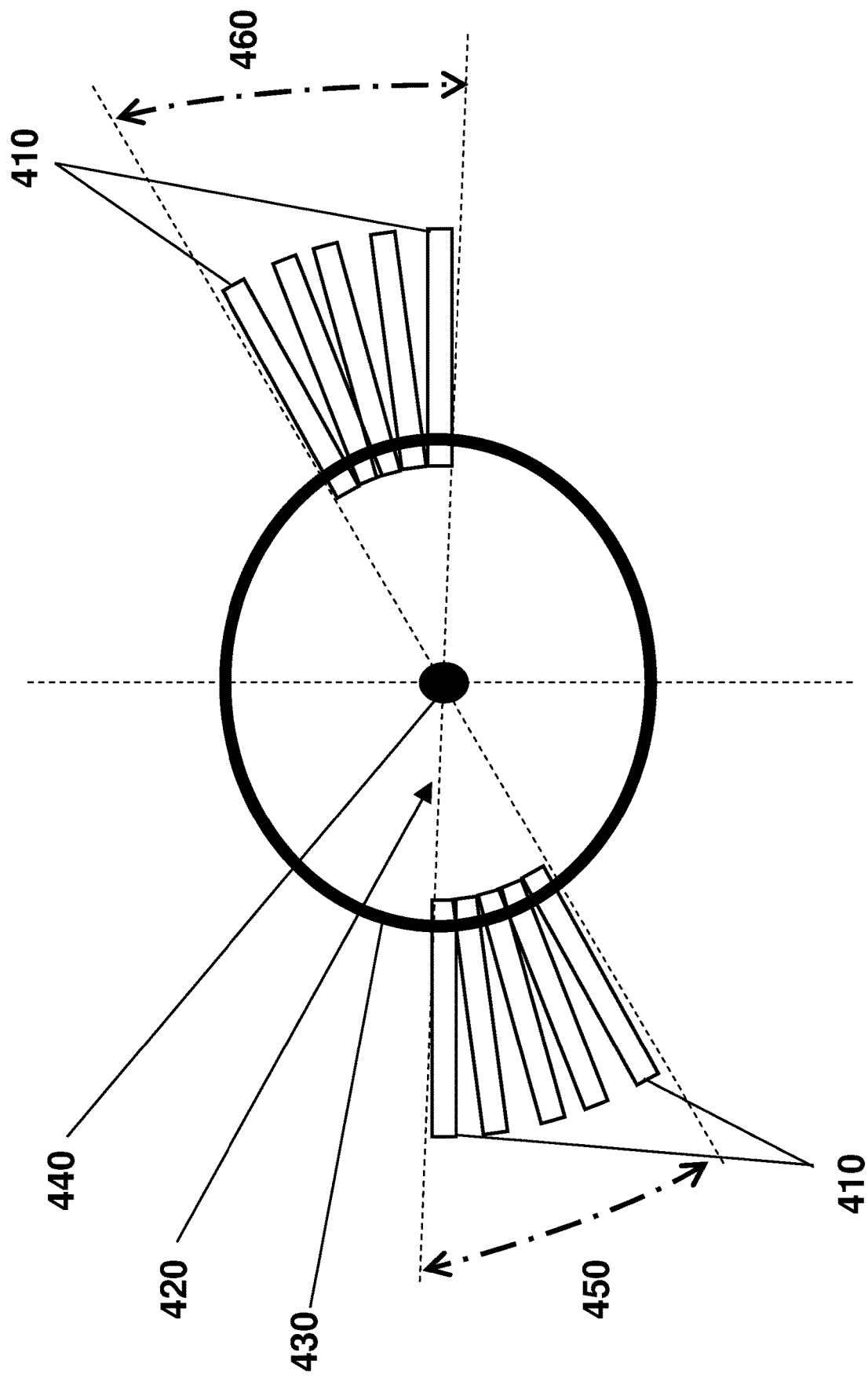
FIG. 4 illustrates a conical arrangement of beamlets around a target chamber, where the beamlets are grouped into two clusters, according to an embodiment.

FIG. 4 illustrates a conical arrangement of beamlets 410 around a target chamber 430, where the beamlets 410 are grouped into two clusters 450 and 460. The two clusters 450 and 460 may have a conical shape. The clusters 450 and 460 may each fill a circle as viewed from the target 440, or the clusters 450 and 460 may each fill a square arrangement. The preferred arrangement is circular so that each of elements 450 and 460 represents a mathematical cone which contains all the beamlets 410 in the respective cluster 450 and 460. The main advantage of the conical arrangement is the increased efficiency of collection of the energetic particles released by the target in implosion.

These arrangements of beamlets 410 around a target chamber 430 should not be construed as limiting. In various embodiments, other arrangements of the beamlets 410 are also possible.

Figure 5:
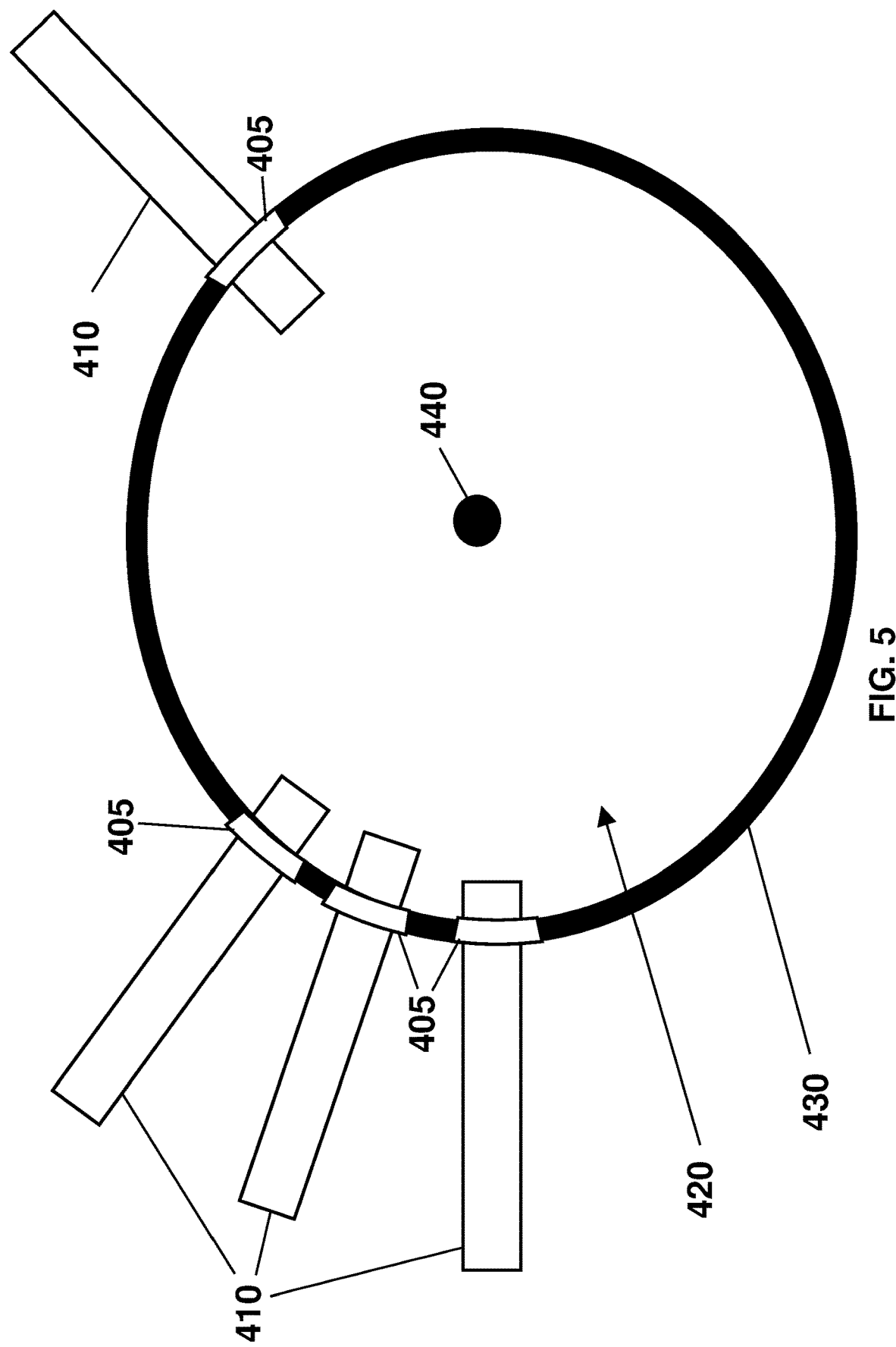
FIG. 5 illustrates details of the relationship between a beamlet and the target chamber wall, according to an embodiment.

FIG. 5 illustrates details of the relationship between a beamlet 410 and the target chamber wall 430, according to an embodiment. Ports 405 are positioned in the target chamber wall 430 through which the beamlets 410 pass. The ports 405 may be windows in the target chamber wall 430 that are optically transparent, but strong enough to contain high vacuum. The windows may be protected from the energetic particles released by the target by positioning a shield in front of the windows. The beamlets 410 enter the target chamber interior 420 at an angle to the chamber wall 430 and are directed to the target 440 by a grazing incidence mirror in a manner well-known to practitioners of this art. While the shields and mirrors are not explicitly shown in FIG. 5, the ports 405 are considered to represent them along with the windows.

Figure 6:
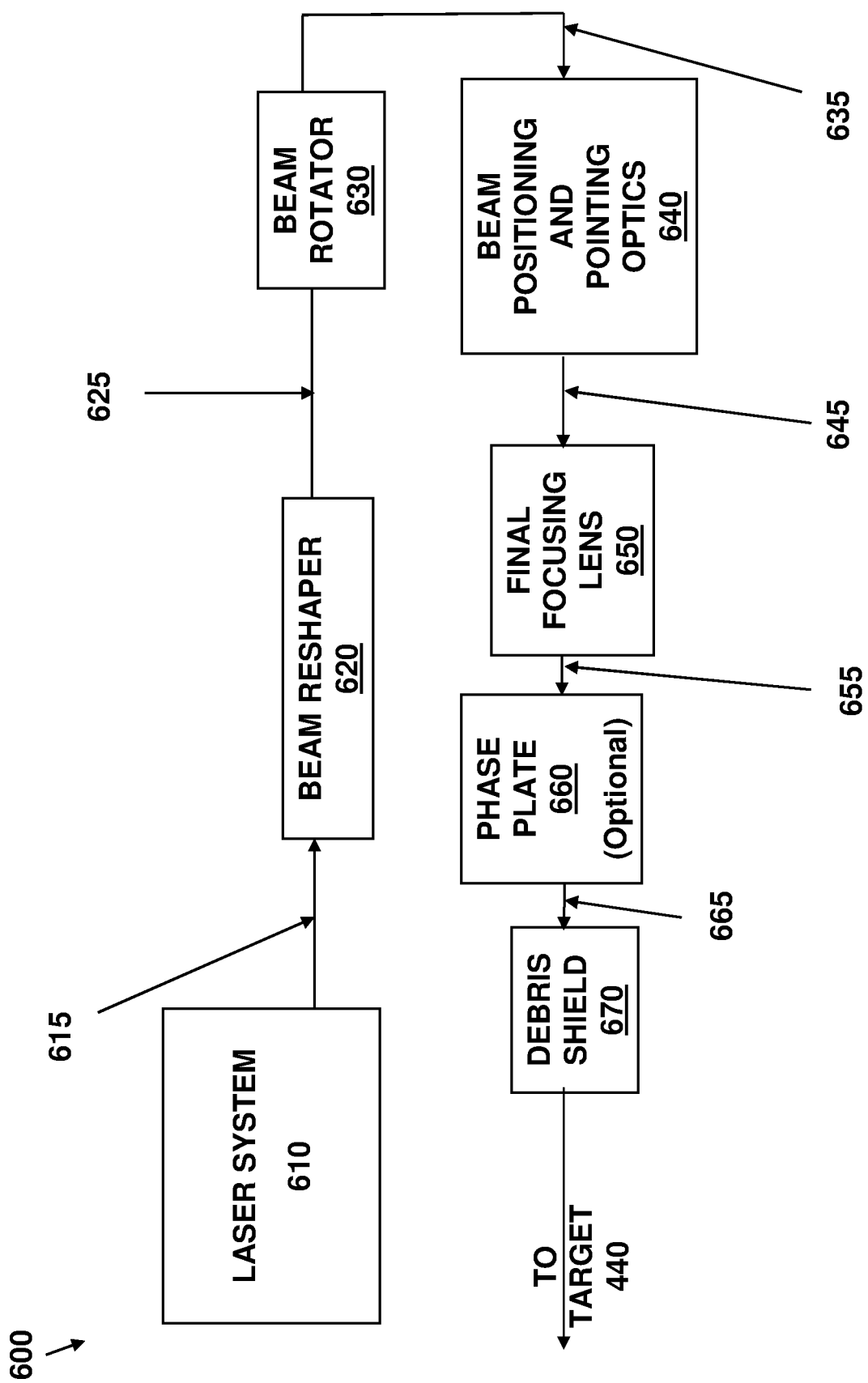
FIG. 6 illustrates a block diagram of a beamlet of a driver laser for inertial fusion energy, according to an embodiment.

FIG. 6 illustrates elements of a driver laser for inertial fusion energy, according to an embodiment. The driver laser may include a plurality of beamlets 600. The beamlet 600 may be an embodiment of the beamlet 410. The main subsystems of the beamlet 600 include a laser system 610 which outputs a rectangular beam 615, a beam reshaper 620 that includes bi-cylindrical lenses and outputs a square beam 625, a beam rotator 630 including two out-of-plane mirrors that outputs a rotated square beam 635, beam positioning and pointing optics 640 that point the rotated square beam 635 toward a final focusing lens 650 that in turn outputs a focused rotated square beam 655 to a phase plate 660. The phase plate 660 includes square segments and is rotated to align its square segments with the rotated square beam profile to output a phase-adjusted beam 665 through a debris shield 670 toward the target 440. The port 405 shown in FIG. 5 divides the subsystems of the beamlet 410 into those at high vacuum inside the target chamber wall 430 and those outside the target chamber wall 430. The target chamber wall 430 may be after the beam positioning and pointing optics 640, or the target chamber wall 430 may be further downstream. The elements of the beamlet 410 should be placed in relation to the target chamber wall 430 such that the laser system 610 and any sensitive optics of the beamlet 410 are protected from the high temperature of the target chamber 430 and the neutron flux and debris released by the target 440 after irradiation.

Figure 7:
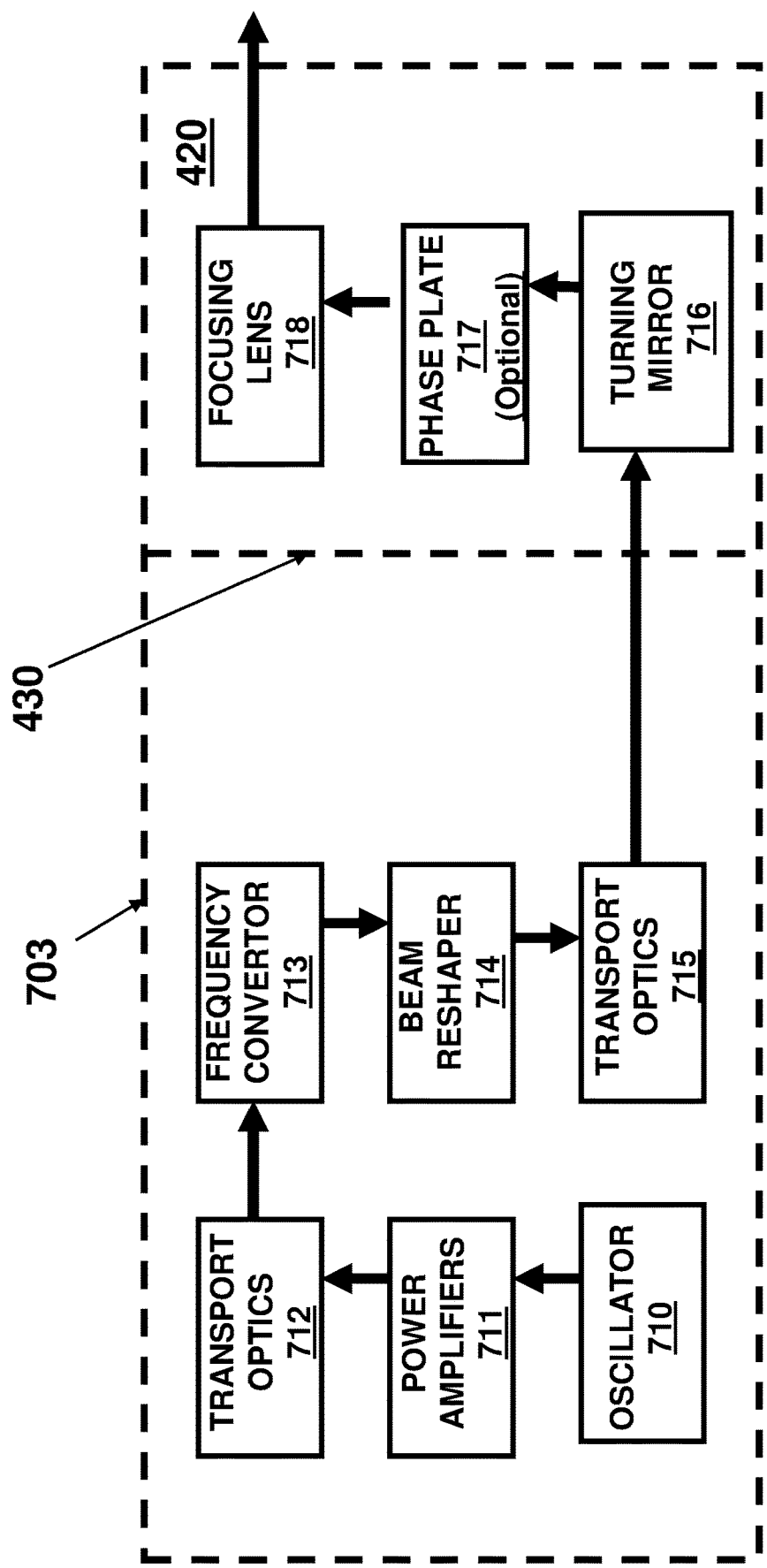
FIG. 7 illustrates a schematic diagram of a beamlet for a driver laser for inertial fusion energy, according to an embodiment.

FIG. 7 illustrates a schematic diagram of a beamlet 410 for a driver laser for inertial fusion energy, according to an embodiment. An oscillator 710, corresponding to the oscillator 200 of FIG. 3, outputs a laser pulse to power amplifiers 711 and transport optics 712. A frequency convertor 713 receives the amplified laser pulse from the transport optics 712, converts the frequency of the laser pulse, and outputs the frequency-converted laser pulse to a beam reshaper 714. The beam reshaper 714 reshapes the beam shape of the laser pulse from a rectangular to a square aperture and outputs the reshaped beam to target chamber transport optics 715 to send the reshaped beam through the target chamber wall 430 into the target chamber interior 420. Inside the target chamber 420, the reshaped beam is turned by a final turning mirror 716 to go through a phase plate 717. The phase plate 717 is configured to control the properties of the focal spot of the beamlet 410. After the laser pulse passes through the phase plate 717, a final focusing lens 718 focuses the laser pulse onto the target 440. It is highly desirable that the only optical element that is exposed to the products of the capsule implosion of the target 440 is the final turning mirror 716. In the preferred embodiments described herein there is only one each of the power amplifiers 711 and transport optics 712. Protection of the optics 716 and 717 is accomplished with a solid shield between the optics and the center of the target chamber.

Figure 8:
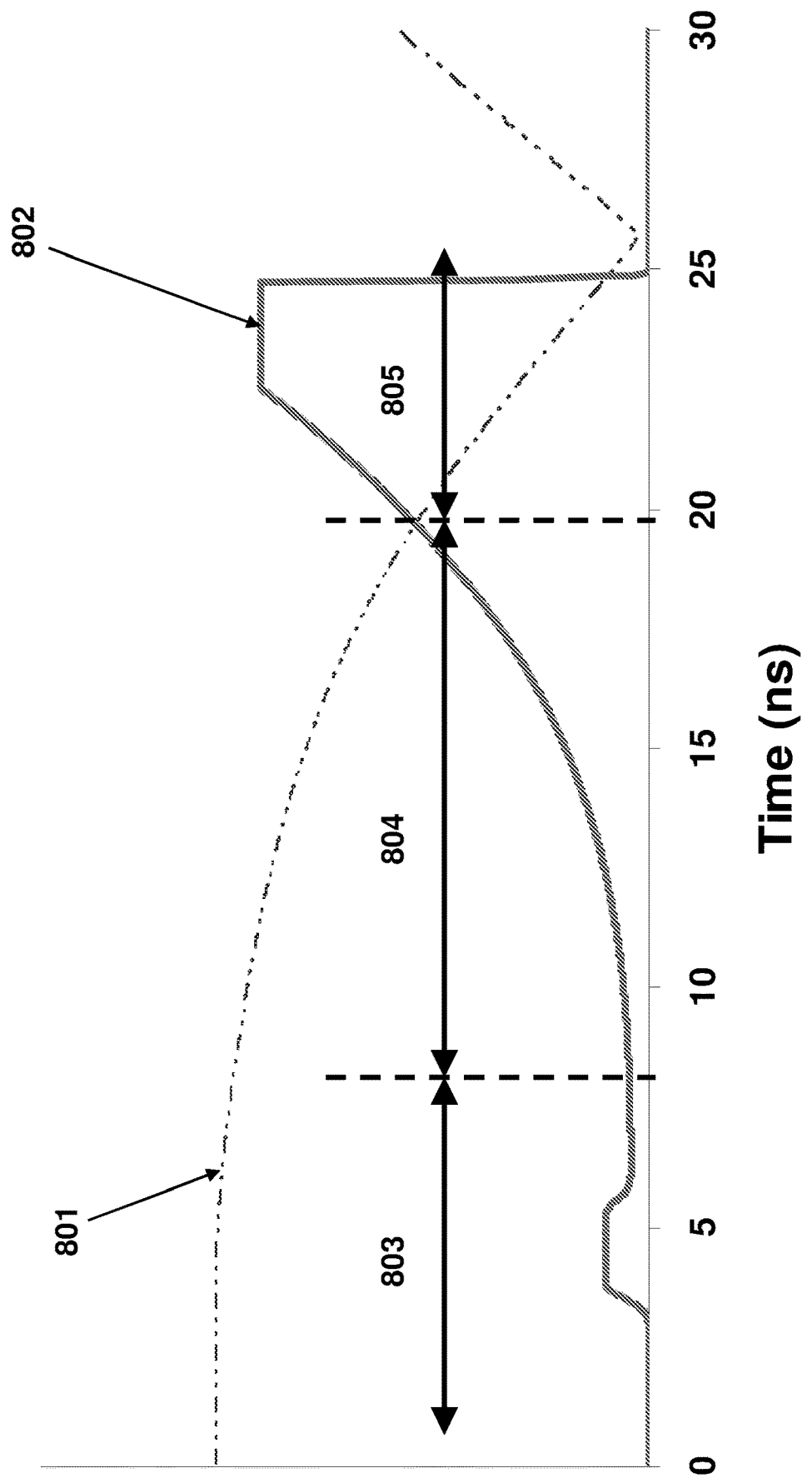
FIG. 8 illustrates a total power of all beamlets in a driver laser as a function of time, according to an embodiment.

FIG. 8 illustrates a total power of all beamlets 410 in a driver laser as a function of time, according to an embodiment. In the various embodiments, the driver laser includes very many beamlets 410, each of which is a simple laser system. FIG. 8 illustrates an exemplary target irradiation pulse 802 and an exemplary history of the target shell radius vs. time 801 to show the advantages of having very many beamlets 410 in the driver laser. The target irradiation pulse 802 generally increases in power up until about a time at which the target shell radius stagnates during a typical target implosion. The curve of the target shell radius vs. time 801 shows the target shell radius accelerating inward and stagnating at about 1/40 of its initial radius. At the point of stagnation, the nuclear payload in the target capsule 440 ignites and burns, and the target shell radius rapidly accelerates outward as the target shell disassembles.

The target irradiation pulse 802 represents the contributions of all of the beamlets 410. The target irradiation pulse 802 increases in power with time and shuts off at or a little before the time when the target radius stagnates. The target irradiation pulse 802 is divided into three segments: an initial segment 803, a growth segment 804, and a high power segment 805. The drive in each of these segments is the sum of the drives from all of the beamlets 410. It will be understood by the practitioners of this art that the boundaries between these three segments 803, 804, and 805 are not rigidly fixed, but represent the general boundaries where the influences of different aspects of the target irradiation pulse 802 have the most significance.

In pulse segment 803, the laser beam impinges directly on the target capsule 440 initially, so any spatial nonuniformities in the laser beam are transferred directly to the shell of the target capsule 440. These nonuniformities can be expected to develop and grow as the shell is accelerated inward. Minimizing the imprint of the laser beam on the target capsule 440 is a high priority during segment 803. The uniformity of the laser beam can be optimized by having approximately 5,000 separate beamlets 410, each with a different frequency spanning a bandwidth of about 1.5% of the mean laser frequency, or about 15 THz in frequency. The smoothness of the laser drive (i.e., summation of all individual laser beams from the individual beamlets 410) on the target capsule 440 drops very rapidly, and asymptotes to a very small number, for example, much less than 1%.

Figure 9:
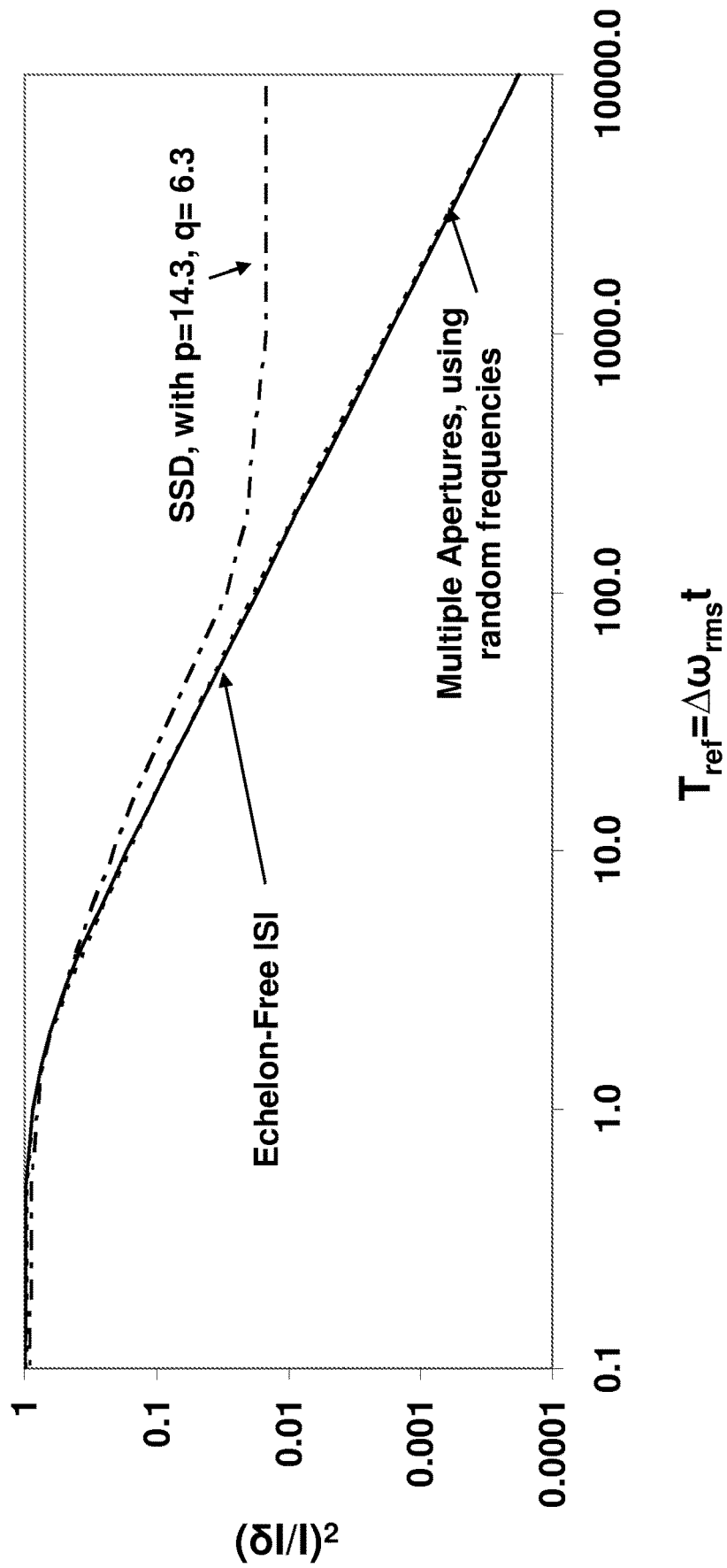
FIG. 9 illustrates smoothness of the laser drive at the target as a function of time, according to an embodiment.

FIG. 9 illustrates smoothness of the laser drive at the target as a function of time, according to an embodiment. FIG. 9 also shows how fast the nonuniformity of the laser drive decreases in time in general for each of the compared types of lasers. Here ($\delta$I/I) is the nonuniformity, t is time in picoseconds, and $\Delta\omega_{rms}$, is the total bandwidth spanned by the 5,000 beamlets. FIG. 9 compares the smoothing of an embodiment as described herein with the performance of the other smoothing schemes SSD and ISI. Note that FIG. 9 compares schemes using laser systems of the same total bandwidth, and not for actual laser systems that utilize these smoothing schemes, because different laser systems have different total bandwidth.

FIG. 10 illustrates the smoothness of the laser drive at the target as a function of time, comparing prior driver lasers with an embodiment as described herein. FIG. 10 compares the smoothing of an embodiment of a 1.5% bandwidth multiple aperture laser with the performance of Omega [LLE201] and Nike[Deniz1998]. The smoothing performance of NIF[Haynam2007] is significantly worse than Omega. The clear advantage of the multiple aperture system is evident in FIG. 10 due to the better smoothness achieved. Moreover, the achievable bandwidth for multiple aperture lasers is limited only by the availability of lasers with a suitable wavelength, and is not intrinsically limited by the smoothing technique.

The spectrum of the intensity ripples of the laser drive at the target 440 can be controlled by selecting the mean wavelength of the beamlets 410 and by controlling the distribution of wavelengths among the beamlets 410. There is some advantage to having the wavelength of the intensity ripples be shorter rather than longer. This can be achieved by having a mean laser wavelength in the ultraviolet and by arranging for the distribution of frequencies among the beamlets 410 so that beamlets 410 with frequencies that are close to each other have apertures that are far apart from each other. This technique is called color separation and is illustrated in FIGS. 11, 12, and 13, as described below.

Figure 11:
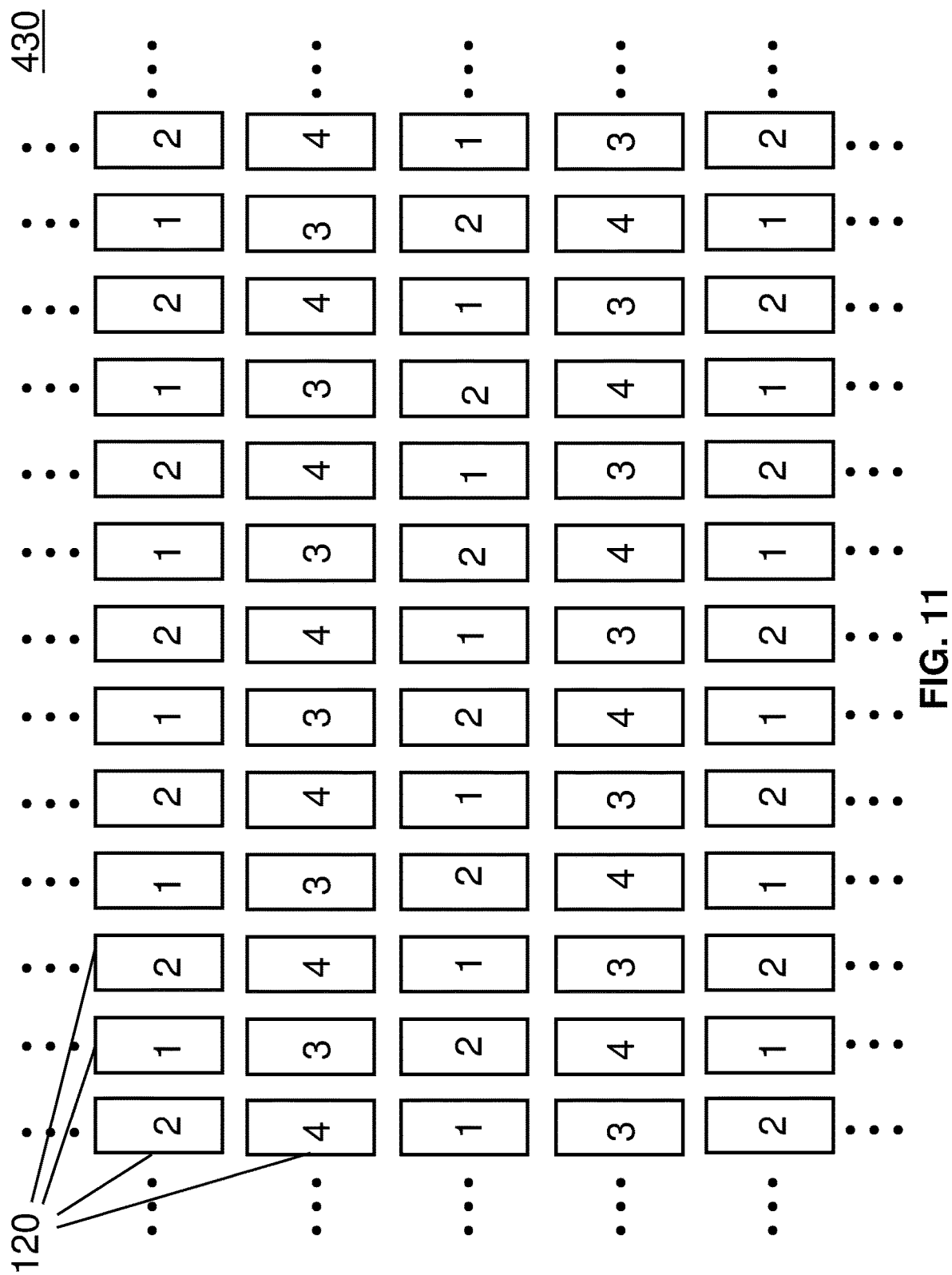
FIG. 11 illustrates an optimal distribution of four frequencies among the beamlets, according to an embodiment.

FIG. 11 illustrates an optimal distribution of four frequencies among the beamlets 410, according to an embodiment. FIG. 11 shows a section of the of the target chamber wall 430 as seen by the target 440. FIG. 11 also illustrates a plurality of beamlet apertures 120 represented as rectangular in shape, but this restriction is not necessary and should not be construed as limiting, as the beam apertures 120 may take the form of other shapes. Some of the apertures 120 in are labeled by a number designating the wavelength of the aperture, for example, wavelength 1, wavelength 2, wavelength 3, and wavelength 4. The distribution shown involves only four different wavelengths, but clearly the separation between apertures of the same wavelength is at least two apertures. If the apertures were square or circular the wavelength separation would be even better.

Figure 12:
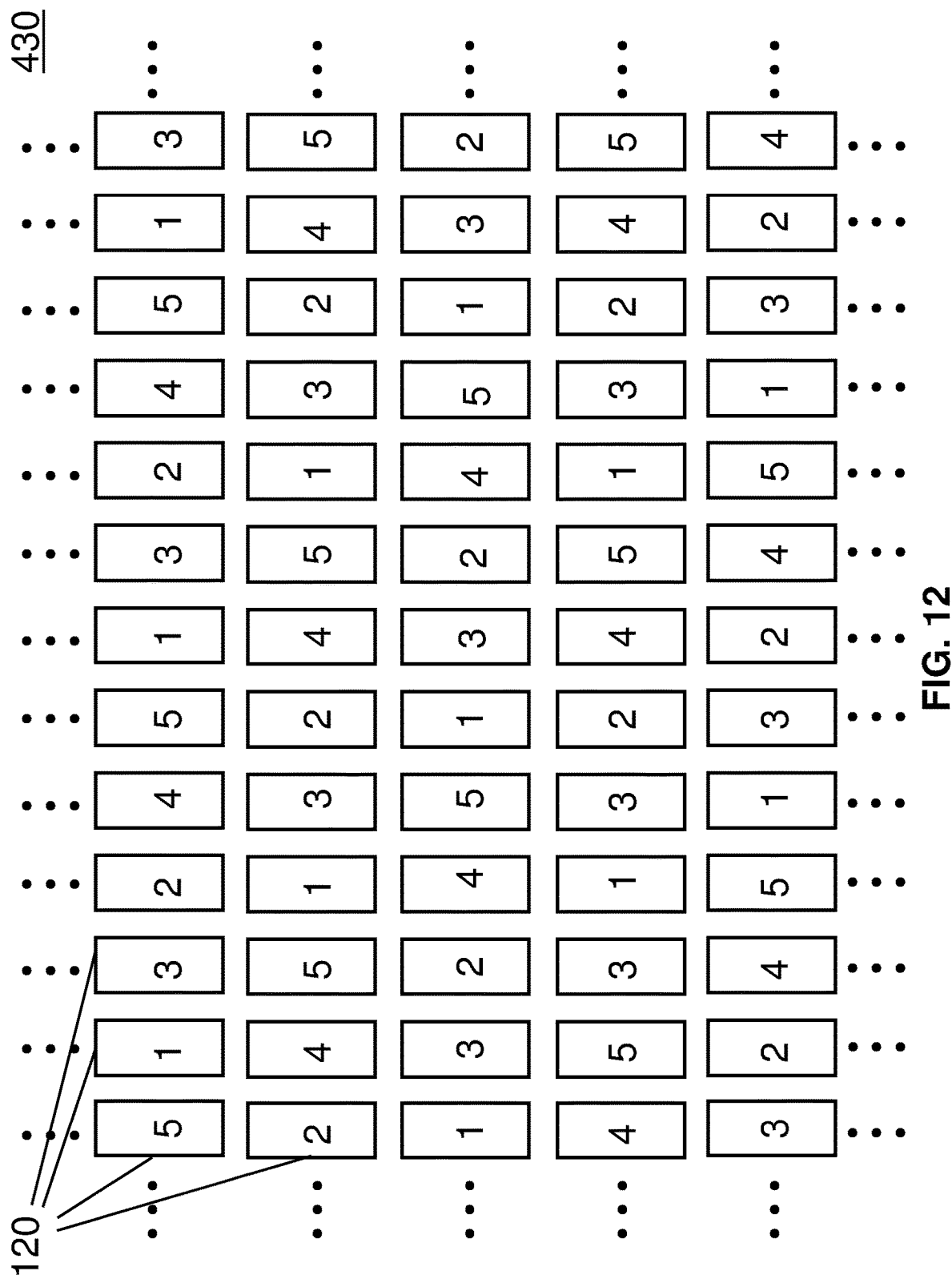
FIG. 12 illustrates an optimal distribution of five frequencies among the beamlets, according to an embodiment.

FIG. 12 illustrates an optimal distribution of five frequencies among the beamlets, according to an embodiment. FIG. 12 shows a similar arrangement as shown in FIG. 12, but using five wavelengths instead.

Figure 13:
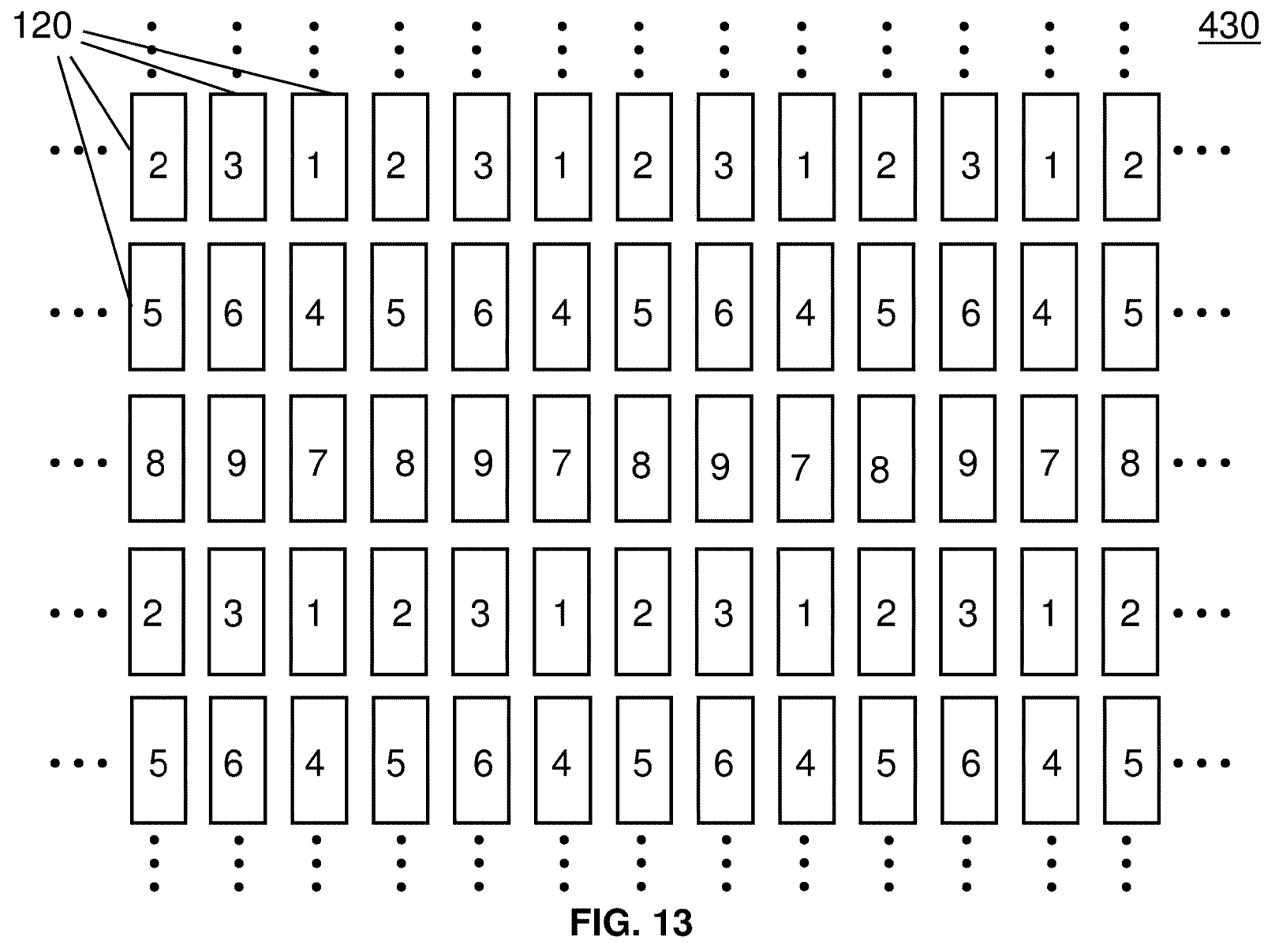

FIG. 13 illustrates an optimal distribution of nine frequencies among the beamlets, according to an embodiment. FIG. 13 shows a similar arrangement as shown in FIGS. 11 and 12, but using nine wavelengths instead. Clearly by using very many different wavelengths, it is possible to arrange for the wavelength separation between similar wavelengths to approach one half the total spread of the apertures. Although we have described herein an approach to maximizing wavelength separation, this should not be construed as limiting, because the techniques described herein will be recognized by one of ordinary skill in the art as allowing great flexibility in controlling the spatial ripples in the intensity pattern at the target 440.

For the high power segment of the laser pulse 802 in FIG. 8, the plasma surrounding the capsule is well-developed and LPI are significant at quarter-critical and lower density in the plasma. LPI can be completely suppressed by configuring the driver laser as approximately 26,000 beamlets 410 containing a few widely separated frequencies. The separation in frequency should be greater than the growth rate of the LPI. The number of different frequencies should be greater than the factor by which the total laser intensity from all beamlets 410 exceeds the LPI threshold intensity. It is expected that four or five different frequencies will be adequate to completely suppress LPI. The mean wavelength of the beamlets 410 should be in the ultraviolet to optimize the coupling of the laser pulses to the target capsule 440. If a longer mean wavelength is used, the number of different frequencies can be increased to compensate for the associated decrease in LPI threshold, and the increased LPI gain. Alternatively, LPI can be eliminated by having a distribution of frequencies among the 26,000 beams whose total bandwidth is several times the growth rate of the LPI, about 50 THz.

For the growth region of the laser pulse 804, the requirements on smoothing and LPI are both less stringent than in the regions 803 and 805. Therefore, the target requirements can be met in the region 804 by having a distribution of frequencies that meets the requirements of regions 803 and 805 simultaneously. One solution is to have several groups of beamlets 410, where the bandwidth of each group is of order 15 THz, but the total bandwidth of all the groups together exceeds about 50 THz.

The pulse length and pulse shape of each beamlet 410 may be chosen individually to optimize the performance of the beamlet 410. For example, the pulse shape may be flat in time to optimize the wall-plug efficiency of the laser and the efficiency of frequency conversion. The beamlet fluence is related to the beamlet aperture through the damage fluence, and the optimum pulse length may be determined by the desired intensity. The number of beamlets 410 delivering pulses at any time in the laser drive pulse is given approximately by $N \tau/T$, where N is the total number of beamlets 410, $\tau$ is the beamlet pulse length, and T is the laser drive pulse length. The smoothing requirement provides a lower limit on the number of beamlets 410 operating at any one time to about 5,000, so the individual pulse length must be greater than about 1 ns. The temporal overlap between beamlet pulses as one turns off and another turns on places an upper limit on the jitter of each beamlet 410 of about 250 ps. The focal spot size and focal spot location of each beamlet 410 may be individually selected to allow the total laser drive to follow the target shell radius as the target capsule 440 implodes. Beamlets 410 operating earlier in the laser drive pulse will have a larger spot size and a shorter focal length than those operating later in the laser drive pulse. A practitioner in the art having ordinary skill will recognize that these temporal requirements and focal behaviors are well within current technological capability.

Laser materials exist to provide the desired total bandwidth. In the field of Nd:Glass and Nd:Crystal lasers, there is wide tunability of the laser wavelength depending on the host material. For example, a suite of phosphate, silicate and aluminate glass hosts is known to span the region 1.025-1.075 microns, which would provide a total bandwidth of about 5%, which amounts to 50 THz after frequency conversion to the ultraviolet range. These materials may be pumped by diode lasers, which enable wall-plug efficiencies in the range of 5%-25%. The average power requirement for IFE can easily be met using these hosts.

Figure 18:
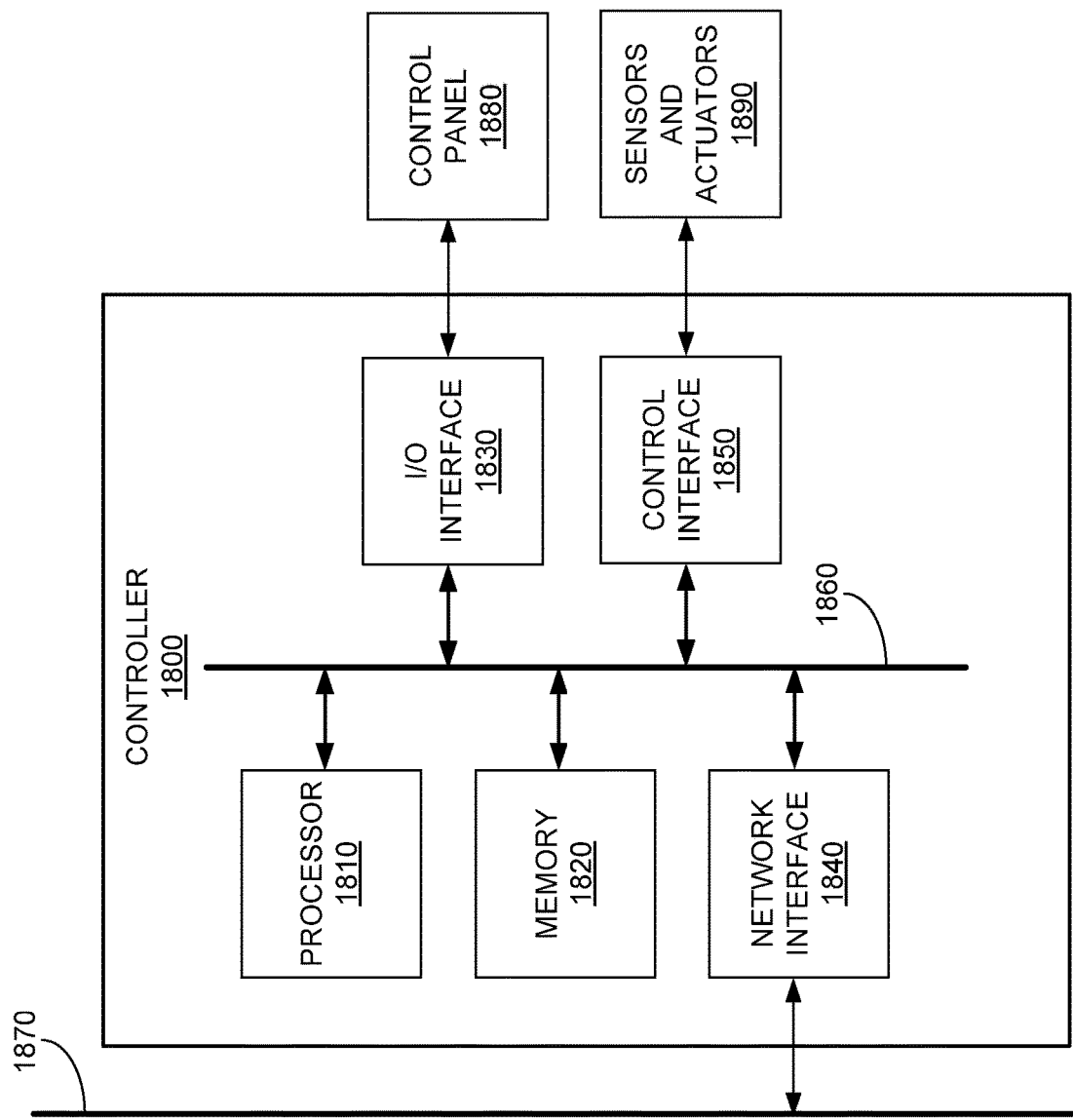
FIG. 18 illustrates a controller of the driver laser, according to an embodiment.

FIG. 18 illustrates a controller 1800 of the driver laser, according to an embodiment. Embodiments of the controller 1800 may control the individual beamlets of the driver laser, the driver laser as a whole, or a combination thereof. For example, one embodiment of the controller 1800 may control each of the beamlets, while another embodiment of the controller 1800 may control the driver laser as a whole by communicating with each of the embodiments of the controllers 1800 that control the beamlets.

The controller 1800 may receive input commands remotely over a data communications network 1870 or input from a user via the control panel 1880, such as turning any of the components of the driver laser or beamlets on or off, selecting an operation mode, setting a desired laser pulse repetition rate, setting a desired laser pulse shape, setting a desired laser pulse power, setting a desired aiming direction and focal point of a laser beam, and setting a desired laser pulse timing of one beamlet in relation to the other beamlets. The controller 1800 may also adjust a wavelength of a wavelength tunable laser. The controller 1800 may output information to the user regarding an operational status of the beamlets or driver laser using a display panel of the control panel 1880 or remotely over the data communications network 1870.

The controller 1800 may include a processor 1810 that performs computations according to program instructions, a memory 1820 that stores the computing instructions and other data used or generated by the processor 1810, and a network interface 1840 that includes data communications circuitry for interfacing to the data communications network 1870. The data communications network 1870 may include an Ethernet network, asynchronous transfer mode (ATM) network, WiFi network, IEEE-488 interface bus, universal serial bus (USB), RS-232 serial interface, or other communication links and networks as known in the art. In addition, the network interface 1840 may include a network node of the data communications network 1870 or electronics configured to implement protocols of the data communications network 1870. The processor 1810 may include a microprocessor, a Field Programmable Gate Array, an Application Specific Integrated Circuit, a custom Very Large Scale Integrated circuit chip, or other electronic circuitry that performs a control function. The processor 1810 may also include a state machine. The controller 1800 may also include one or more electronic circuits and printed circuit boards. The processor 1810, memory 1820, and network interface 1840 may be coupled with one another using one or more data buses 1860. The controller 1800 may communicate with and control various sensors and actuators 1890 of the driver laser or beamlets via a control interface 1850.

The controller 1800 may be controlled by or communicate with a centralized computing system, such as one in a control center of a commercial electrical power plant. The controller 1800 may provide network monitoring, power control, remote operation, failure monitoring, and data transfer functions. The controller 1800 may provide additional communications using an RS-232 communications interface and/or an infrared data port, such as communications with a personal computer (PC). Such additional communications may include real-time monitoring of operations of the driver laser or beamlets, long-term data retrieval, and control system software upgrades. In addition, the control interface 1850 may include a serial peripheral interface (SPI) bus that may be used to communicate between the controller 1800 and motor controllers within the driver laser or beamlets.

The controller 1800 may poll the sensors of the sensors and actuators 1890 at a minimum rate such that all data required to control the performance of the driver laser or beamlets may be obtained by the controller 1800 in time for real-time operation of the driver laser or beamlets. The polled values may be reported by the controller 1800 via the I/O interface 1830 and/or the network interface 1840. The polled values may also be used in control algorithms by the controller 1800, and may be stored to long-term memory or a data storage medium for later retrieval and analysis.

Figure 19:
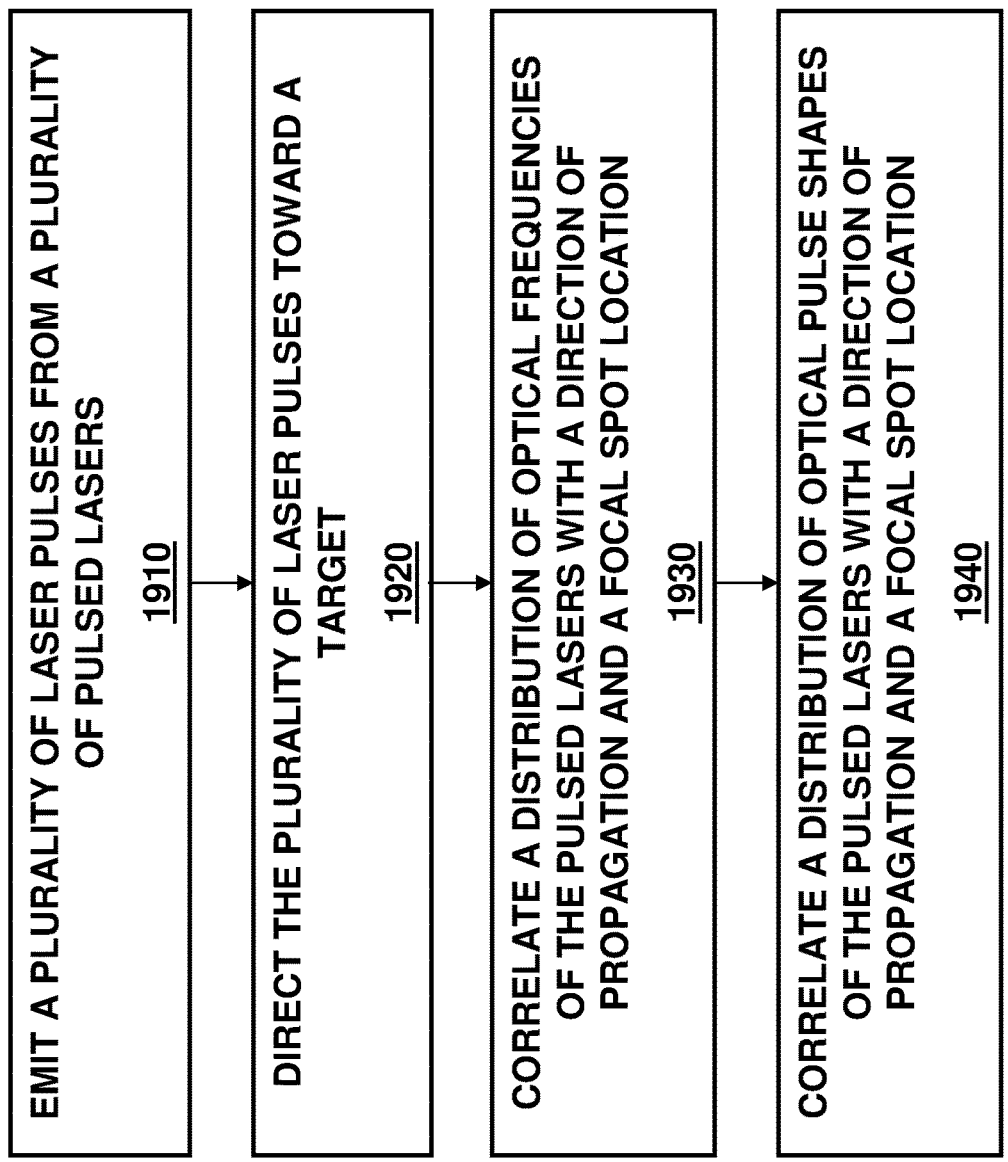
FIG. 19 illustrates a method of driving an inertial confinement fusion reaction for inertial fusion energy generation, according to an embodiment.

FIG. 19 illustrates a method of driving an inertial confinement fusion reaction for inertial fusion energy generation, according to an embodiment. While the steps of the embodiment are illustrated in a sequential order, this should not be construed as limiting, as in various embodiments, any of the steps may be performed in a different order with respect to the other steps.

In a step 1910, a plurality of laser pulses are emitted from a plurality of pulsed lasers. In various embodiments, there may be at least 512 (i.e., $2^8$) pulsed lasers, or at least $2^9$, at least $2^{10}$, at least $2^{11}$, at least $2^{12}$, at least $2^{13}$, at least $2^{14}$, at least $2^{15}$, at least $2^{16}-1$, or at least any number within a range of the aforementioned minimum numbers. In various embodiments, there may also be a maximum of $2^8+1$ pulsed lasers, a maximum of $2^9$ pulsed lasers, a maximum of $2^{10}$ pulsed lasers, a maximum of $2^{11}$, a maximum of $2^{12}$, a maximum of $2^{13}$, a maximum of $2^{14}$, a maximum of $2^{15}$, a maximum of $2^{16}$, a maximum of $2^{17}$, a maximum of $2^{18}$, a maximum of $2^{19}$, or a maximum of any number within a range of the aforementioned maximum numbers.

A central optical wavelength of each pulsed laser may be between about 250 nm and 2500 nm, and the root mean square bandwidth of the laser system may be greater than about 1 THz. The plurality of pulsed lasers may be configured to output laser pulses at a plurality of different frequencies. Optical frequencies of at least two of the pulsed lasers may be different from each other by more than about 1 THz. In addition, optical states of polarization of at least two of the pulsed lasers may be substantially different from one another.

In a step 1920, the plurality of laser pulses are directed toward a target from different exit apertures along different propagation directions such that each of the plurality of laser pulses irradiate different portions of the target within a same time window as the others of the plurality of laser pulses. In other words, such that all of the plurality of laser pulses irradiate different portions of the target within a same or common time window. The time window may be less than about 100 ns, or other period of time sufficient to meet the laser drive requirements to cause the target capsule to implode, heat, and initiate a controlled thermonuclear fusion reaction as discussed herein. The controlled thermonuclear fusion reaction may release energy, for example, greater than about 20 kJ. Each of the plurality of laser pulses may be considered to irradiate different portions of the target substantially simultaneously. The pulses may be considered to irradiate the target substantially simultaneously when the pulses irradiate the target within a close enough window of time such that the target implodes to create a controlled fusion reaction as described herein, even though the pulses may not irradiate the target literally simultaneously. For example, the pulses may irradiate the target substantially simultaneously such that the target implodes while also irradiating the target at substantially different times such the pulses are time sequenced from individual pulsed lasers or groups of pulsed lasers so that all of the features of the driver laser may be finely controlled at each instant during the entire laser drive pulse at the target. Thus, the pulsed lasers that generate the laser pulses may be time-sequenced so that only a portion of the laser pulses irradiate the target at any one precise moment in time.

The laser pulses may be directed toward the target in a substantially spherical distribution, in groupings of conical distributions, or in other distributions that facilitate target implosion as described herein. In addition, the laser pulses may be directed toward the target such that the pulses irradiate the target in an overlapping pattern where each beam associated with each pulse irradiates less than the surface area of the target visible to the pulsed laser emitting the beam, and the beams of the different pulses do not fully overlap. An example of an overlapping pattern is a hexagonal pattern as illustrated in FIG. 14. In addition, the laser pulses may be directed toward the target in a pattern such that an angle between propagation directions of any two laser pulses from respective pulsed lasers whose center frequencies differ by less than about 250 THz is greater than about 0.01 radians. A total area of the exit apertures of the plurality of pulsed lasers may occupy a solid angle of less than 0.5 steradians from the target's perspective.

In a step 1930, a distribution of the optical frequencies of the pulsed lasers are correlated with a direction of propagation and a focal spot location of the respective laser pulses emitted by the pulsed lasers toward the target according to a predetermined prescription. According to the predetermined prescription, a spatial uniformity of intensity of the plurality of laser pulses at a surface of the target as computed from a ratio of the root mean square variation in the intensity over the surface of the target to the average value of the intensity over a time interval during which the plurality of laser pulses irradiate the target surface may be substantially maximized. Also according to the predetermined prescription, a variation in spatial uniformity of intensity of the plurality of laser pulses at a surface of the target as computed from a ratio of the root mean square variation in the intensity over the surface of the target to the average value of the intensity over a time interval during which the plurality of laser pulses irradiate the target surface may be less than about 0.25%. Furthermore, according to the predetermined prescription, a smoothing rate of the summation of the plurality of laser pulses of the laser system at the target may be substantially maximized at a spatial scale length of between about 10 and 100 microns. In addition, according to the predetermined prescription, the plurality of laser pulses that irradiate the target may be substantially smoothed at a rate faster than about 30 THz.

In a step 1940, a distribution of optical pulse shapes of the pulsed lasers may be correlated with a distribution of propagation and a focal spot location of the respective laser pulses emitted by the pulsed lasers toward the target according to a predetermined prescription. According to the prescription, temporal pulse shapes of at least two of the pulsed lasers having different optical frequencies may be substantially different from one another. As such, the pulses may also irradiate the target at substantially different times, as the pulse shape of one laser pulse may not have substantial energy at a moment in time at which the shape of another laser pulse does have substantial energy, and vice versa. In an embodiment, one laser pulse may have a temporal pulse width of less than about 50 ps, while a different laser pulse may have a temporal pulse width of between 1 ns and 100 ns.

In summary, concepts of the embodiments as described herein may be used by a practitioner of the art of laser science and technology to provide a driver for laser-driven ICF which has the capability and the flexibility to meet the target requirements for IFE, as well as the cost and efficiency requirements for IFE power plant for commercial electricity generation. Embodiments include many small beamlets, together with a distribution of frequencies and other laser beam properties among the beamlets to optimize beam smoothing and LPI suppression, a pulse shape output from each beamlet which enables fine control of the temporal properties of the laser drive at the target.

In contrast to current lasers for ICF drivers, various embodiments as described herein can deliver greater bandwidth, higher efficiency, greater control of the beams at the target, greater control of the instabilities which degrade target performance, and more reliable, repeatable and controllable laser performance than any previously articulated approach to ICF drivers. In comparison to all the prior driver lasers, embodiments as described herein exceed their performance. In contrast to the prior driver lasers, embodiments as described herein have the flexibility to meet all the requirements for ICF in a fully controlled and repeatable manner.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a controller including a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Glossary

USD: US Dollars
MW: Megawatt
GW: Gigawatt
Cms: centimeters
L-mode: a spatial variation in the drive experienced by the target with approximately 2L+1 peaks and valleys around a target perimeter.
Hz: Hertz
ICF: Inertial Confinement Fusion
IFE: Inertial Fusion Energy
LPI: Laser plasma instabilities
Hr: Hour
MW-hr: megawatt-hour
nm: nanometer
kJ:—kiloJoule
ns: nanosecond
ps: picosecond
DT reaction: nuclear reaction between deuterium (D) and tritium (T) nuclei
KrF lasers: A gas laser utilizing Krypton Fluoride as the active medium:
mrad: milliradians
Nd: glass laser: a solid state laser utilizing Neodymium ions as the active ion in a glass host.
Nd:crystal laser: a solid state laser utilizing Neodymium ions as the active ion in a crystalline host
FWHM: full width at half maximum
LPI: laser-plasma instabilities
Target: The device at which a laser beam or combination of laser beams is directed.

Target Region: A small volume of space enclosing said target.
Target Reference Surface: The surface of said target region.
Intensity: The irradiance of light, often expressed in units of GigaWatts per square centimeter.
Exit Aperture: The last optical element of a laser.
Beamlet: A laser system which is part of a large laser system, whose exit aperture is not shared by any other beamlet of said laser system.
Pulse Length: The interval in time in which the intensity of a laser beam is substantially different from zero.
Pulse Shape: A specific variation of the intensity or total power of a laser beam or laser system within the pulse length of said laser beam or system.
Wavelength: The optical wavelength of light.
Bandwidth: The spread in wavelength of either a single laser beam or beamlet, or the spread in wavelength of a laser system comprising more than one individual laser. Bandwidth is often expressed as the ratio of the root mean square variation in the wavelength within a specified time interval, to the average value of the wavelength over said time interval.
Smoothness: The spatial uniformity of the intensity or fluence of a laser beam or combination of laser beams at a target region surface. Smoothness is often expressed as the ratio of the root mean square variation in the intensity over the target region, to the average value of the intensity over said time interval and at different spatial frequencies
Substantially the same frequency: Beams of substantially the same frequency deposit energy at locations in the plasma surrounding the target that differ by less than the heat diffusion distance, where these terms have a meaning following the standard practice well-known to those skilled in the art of ICF.

BACKGROUND REFERENCES

Azechi2006: "Present status of the FIREX programme for the demonstration of ignition and burn", H. Azechi, Plasma Phys. Control. Fusion 48 (2006) B267-B275
Bayramian2007 "The mercury project: a high average power, gas-cooled laser for inertial fusion energy development", a. Bayramian, etal, Fusion Science and Technology 52, 383
Bayramian2010: "A Laser Technology Test Facility for Laser Inertial Fusion Energy (LIFE)", A. J. Bayramian, R. W. Campbell, C. A. Ebbers, B. L. Freitas, J. Latkowski, W. A. Molander, S. B. Sutton, S. Telford, and J. A. Caird, Journal of Physics: Conference Series 244 (2010)
Bayramian2011 "Compact, efficient laser systems required for laser inertial fusion energy", Bayramian, et.al., Fus. Sci. Tech 60, 28 (2011).
Bettinger1999: "Laser Megajoule project and impact on the inertial fusion program", A. Bettinger and M. Decroisette, Fusion Engineering and Design, Vol 46, Issues 2-4, November 1999, 457
Caird2009: "Nd:Glass Laser Design For Laser ICf Fission Energy (Life)", John Caird etal, Fusion Science And Technology Vol. 56, 607(2009)
Campbell1999a: "The National Ignition Facility: Applications for Inertial Fusion Energy and High Energy Density Science". E. Michael Campbell and William J. Hogan, 26th European Physical Society Conference on Controlled Fusion and Plasma Physics, Maastricht, Netherlands, Jun. 14-18, 1999

Campbell1999b: "Inertial Fusion Science and Technology for the Next Century", E. Michael Campbell, William J. Hogan, David H. Crandall, First International Conference on Inertial Fusion Sciences and Applications, Bordeaux, France, Sep. 12-17, 1999

Campbell1999c: "Inertial fusion energy development: what is needed and what will be learned at the National Ignition Facility", E. Michael Campbell, William J. Hogan, David H. Crandall, First International Conference on Inertial Fusion Sciences and Applications, Bordeaux, France, Sep. 12-17, 1999

Campbell2006: "Status of Fast Ignition Research", E. Michael Campbell, Fusion Power Associates, Washington DC, Sep. 27-18, 2006

Deniz1998: "Comparison between measured and calculated nonuniformities of Nike laser beams smoothed by induced spatial incoherence", A. V. Deniz, etal, Optics Communications 147, 402 (1998)

Deutsch1998: "The Interaction Physics Of The Fast Ignitor Concept", C. Deutsch, H. Furukawa, K. Mima, M. Murakami And K. Nishihara Astrophysics and Space Science 256: 161-168, 1998

Dunne2007: "HiPer: Technical Background and Conceptual Design Report 2007", M. Dunne etal,(2007), available from http://www.hiper-laser.org/docs/tdr/hiper_tdr_full-version.pdf Dunne2012: "LIFE Design Approach—Safety, Reliability and Economic Viability" Mike Dunne, on-line at https://life.llnl.gov/

Haynam2007: "National Ignition Facility laser performance status", C. A. Haynam etal, Applied Optics, Vol. 46, No. 16 (1 Jun. 2007), 3276

Hogan1991: "An IFE development strategy", Hogan, W. J.; Storm, E.; Lindl, J. D., OSTI ID: 5305963; Legacy ID: DE91016918, UCRL-JC-105833

Labaune2008: "On the feasibility of fiber-based inertial fusion laser driver,", Labaune, D. Hulin, A. Galvanauskas, G. A. Mourou, Opt. Commun. 281, 4075 (2008).

Lehmberg1993: "The Use of Induced Spatial Coherence for Uniform Illumination of Laser Fusion Targets" R. H. Lehmberg and S. P. Obenschain, Optics Comunications, 46, 27(1983)

Lehmberg1998: U.S. Pat. No. 4,790,627 "Incoherent laser system for producing smooth and controllable spatial illumination profiles", R. H. Lehmberg, Inventor. Issued Dec. 13, 1988

Lehmberg2000: "Comparison of optical beam smoothing techniques for inertial confinement fusion and improvement of smoothing by the use of zero correlation masks", R. H. Lehmberg and J. E. Rothenberg, J Appl. Phys 87, 1012 (2000)

Lehmberg2005: "Near-Field Nonuniformities in Angularly Multiplexed KrF lasers with Induced Spatial Incoherence" R. H. Lehmberg and Y. Chan, Naval Research Laboratory, Appl. Optics. 44, 2805 (2005)

Lindl1995: "Development of the indirect drive approach to inertial confinement fusion and the target physics basis for ignition and gain", J. Lindl, Phys. Plasmas 2, 3933 (1995)

LLE2012: "LLE Review", Scientific reports of the Laboratory for Laser Energetics, University of Rochester, 250 E. River Rd, Rochester, Vols 1-126, McCrory2011: "Laser-Driven Inertial Fusion Energy; Direct-Drive Targets Overview", R. L. McCrory, NAS/NAE Committee on the Prospects for IFE Systems San Ramon, CA 29 Jan. 2011

McCrory2012: "Omega Laser Facility—Laboratory for Laser Energetics", University of Rochester—Laboratory for Laser Energetics, 250 E. River Rd, Rochester, NY 14623-1299, on line at http://www.lle.rochester.edu/omega_facility/, and links therein.

Moses2009: "Ignition on the National Ignition Facility: a path towards inertial fusion energy", Edward I. Moses, Nucl. Fusion 49 (2009)

Nardella2008: "Office of Fusion Energy Sciences (OFES) Perspective", Gene Nardella, Presentation to FESAC Panel, August 2008

Nuckolls1972 "Laser Compression of Matter to Super-High Densities: Thermonuclear (CTR) Applications", J Nuckolls, L. Wood, A. Thiessen and G. Zimmerman, Nature 239,193(1972)

Nuckolls1982: "The feasibility of inertial—confinement fusion", J. H. Nuckolls, Physics Today 35, 24 (1982)

Obenschain2011 "Development Path for Inertial Fusion Energy: Advantages of Utilizing Direct Drive with the Krypton Fluoride Laser", $24^{th}$ Symposium on Fusion Engineering, Chicago, Illinois 29 Jun. 2011

Orth1996: "A diode pumped solid state laser driver for inertial fusion energy", C. D. Orth, S. A. Payne, W. F. Krupke, Nuclear Fusion, 36, 75 (1996)

Paisner1994: "The National Ignition Facility Project", J. A. Paisner, E. M. Campbell, W. F. Hogan, ANS $11^{th}$ Annual Conference on Fusion Energy, New Orleans, Jun. 16, 1994.

Perkins2009: "Shock Ignition: A New Approach to High Gain Inertial Confinement Fusion on the National Ignition Facility", L. J. Perkins, R. Betti, K. N. LaFortune, W. H. Williams, Physical Review Letters, Vol. 103, No. 4. (2009)

Rothenberg1996: "The Impact of Beam Smoothing Method on Direct Drive Target Performance for the NIF", J. E. Rothenberg and S. V. Weber, 2nd Annual International Conference on Solid-State Lasers for Application to ICF, Paris, France, Oct. 22-25, 1996

Sethian2002: "The Electra KrF Laser Program", J. L Sethian, et al, on-line at http://www.nrl.navy.mil/research/nrl-review/2002/particles-plasmas-ams/sethian/

Skupsky1989: "Improved laser-beam uniformity using the angular dispersion of frequency modulated light" S. Skupsky etal, J App. Phys. 66, 3456(1989)

Skupsky1993: "Speckle-Free phase plate (diffuser) for far-field applications", S. Skupsky and T. J. Kessler, J. Appl. Phys 74, 4310 (1993)

Storm1991: "An ICF (Inertial Confinement Fusion) power plant development program" Storm, E.; Hogan, W. J.; Lindl, J. D., OSTI ID: 6310642; Legacy ID: DE91006713, UCRL-JC-105467

Tabak1994: "Ignition and high gain with ultrapowerful lasers", Max Tabak, James Hammer, Michael E. Glinsky, William L. Kruer, Scott C. Wilks, john Woodworth, Michael Campbell and Michael D. Perry, Phys. Plasmas 1 (5), 1626 (1994)

Theobald2008: "Initial experiments on the shock-ignition inertial confinement fusion concept", W. Theobald, etal, Phys. Plasmas 15, 056306 (2008).

Theobald2009: "Shock-Ignition Experiments on OMEGA at NIF-Relevant Intensities", LLE Review, Volume 119, 122 (2009)

What is claimed is:

1. A method of controlling a laser fusion system by a laser controller, the laser fusion system comprising a plurality of at least four pulsed lasers that emit laser pulses that irradiate a target, the method comprising:

controlling the plurality of at least four pulsed lasers to irradiate the target within a same time window of less than about 100 ns;

controlling at least four of the plurality of at least four pulsed lasers to have different central optical frequencies such that the central optical frequencies of their respective emitted laser pulses differ by more than 1 THz; and controlling the central optical frequency of each of the plurality of pulsed lasers to be correlated with a direction of propagation toward the target of the corresponding laser pulses to contribute to statistical averaging of the Fourier components $I(\kappa,t)$ of the intensity of a local electric field of a laser drive at the target.

2. The method of claim 1, further comprising controlling the plurality of pulsed lasers such that each pulsed laser of the plurality of pulsed lasers irradiates the target with a laser pulse simultaneously with the other pulsed lasers within the same time window.

3. The method of claim 1, further comprising controlling the plurality of pulsed lasers to deliver the laser pulses to the target in a substantially spherical distribution.

4. The method of claim 3, further comprising:
correlating a distribution of the central optical frequencies of the pulsed lasers with a direction of propagation; and
controlling a focal spot location of the respective laser pulses emitted by the pulsed lasers toward the target according to a predetermined prescription.

5. The method of claim 4, further comprising, according to the predetermined prescription, controlling a variation in spatial uniformity of intensity of the plurality of laser pulses at a surface of the target as computed from a ratio of a root mean square variation in the intensity over the surface of the target to an average value of the intensity over a time interval during which the plurality of laser pulses irradiate the target surface to be less than about 1%.

6. The method of claim 4, further comprising, according to the predetermined prescription, controlling a variation in spatial uniformity of intensity of the plurality of laser pulses at a surface of the target as computed from a ratio of a root mean square variation in the intensity over the surface of the target to an average value of the intensity over a time interval during which the plurality of laser pulses irradiate the target surface to be less than about 0.25%.

7. The method of claim 4, further comprising substantially maximizing a smoothing rate of the summation of the plurality of laser pulses of the laser system at the target at a spatial scale length of between about 10 and about 100 microns, according to the predetermined prescription.

8. The method of claim 4, further comprising substantially smoothing the plurality of laser pulses from the laser system that irradiate the target at a rate faster than about 30 THz, according to the predetermined prescription.

9. The method of claim 4, further comprising:
controlling a central optical wavelength of each pulsed laser to be between about 250 nm and 2500 nm; and
controlling the root mean square bandwidth of the laser system to be greater than about 1 THz.

10. The method of claim 4, further comprising controlling temporal pulse shapes of the at least four of the plurality of pulsed lasers to have substantially different central optical frequencies from each other.

11. The method of claim 4, further comprising controlling optical states of polarization of at least two of the emitted laser pulses that irradiate the target from different respective pulsed lasers to be different from each other.

12. The method of claim 4, further comprising controlling a temporal pulse width of at least one of the plurality of laser pulses to be less than about 50 ps.

13. The method of claim 4, further comprising:
controlling a first temporal pulse width of a first laser pulse of the plurality of laser pulses to be between about 1 ns and 100 ns; and
controlling a second temporal pulse width of a second laser pulse of the plurality of laser pulses to be less than about 50 ps.

14. The method of claim 4, further comprising controlling at least two of the plurality of laser pulses to irradiate the target surface at substantially different times.

15. The method of claim 4, further comprising controlling an angle between propagation directions of any two laser pulses from respective pulsed lasers whose central optical frequencies differ by less than about 250 THz to be greater than about 0.01 radians.

16. A method of controlling a laser fusion system comprising a plurality of at least four pulsed lasers that emit laser pulses toward a target, the method comprising:
controlling at least four of the plurality of at least four pulsed lasers to have central optical frequencies that respectively differ by more than about 1 THz;
controlling the central optical frequency of each of the plurality of pulsed lasers to be correlated with a direction of propagation toward the target of the corresponding laser pulses to contribute to statistical averaging of the Fourier components $I(\kappa,t)$ of the intensity of a local electric field of a laser drive at the target;
controlling the laser pulses from each of the plurality of pulsed lasers to irradiate the target from a different direction; and
controlling the plurality of pulsed lasers to irradiate the target with a laser pulse within a same time window of less than about 100 ns.

17. The method of claim 16, further comprising:
controlling the plurality of pulsed lasers to correlate a distribution of the central optical frequencies of the pulsed lasers with a respective direction of propagation; and
controlling a focal spot location of the respective laser pulses emitted by the pulsed lasers toward the target according to a predetermined prescription.

18. The method of claim 17, further comprising controlling, according to the predetermined prescription, a variation in spatial uniformity of intensity of the plurality of laser pulses at a surface of the target as computed from a ratio of a root mean square variation in the intensity over the surface of the target to an average value of the intensity over a time interval during which the plurality of laser pulses irradiate the target surface to be less than about 1%.

19. The method of claim 17, further comprising controlling, according to the predetermined prescription, a variation in spatial uniformity of intensity of the plurality of laser pulses at a surface of the target as computed from a ratio of a root mean square variation in the intensity over the surface of the target to an average value of the intensity over a time interval during which the plurality of laser pulses irradiate the target surface to be less than about 0.25%.

20. A method of driving an inertial confinement fusion reaction at a target using a laser fusion system, the method comprising:
emitting a plurality of at least four laser pulses from a plurality of at least four pulsed lasers;

controlling central optical frequencies of at least four of the plurality of pulsed lasers to be different from each other by more than about 1 THz; and directing each of the plurality of laser pulses from a different pulsed laser along a different propagation direction such that all of the plurality of laser pulses irradiate different portions of the target within a same time window of less than about 100 ns; and controlling the central optical frequency of each of the plurality of pulsed lasers to be correlated with the respective propagation direction of the corresponding laser pulses toward the target to contribute to statistical averaging of the Fourier components $I(\kappa,t)$ of the intensity of a local electric field of a laser drive at the target.

* * * * *